(12) United States Patent
Tanabe et al.

(10) Patent No.: US 8,059,495 B2
(45) Date of Patent: Nov. 15, 2011

(54) HEAD GIMBAL ASSEMBLY AND INFORMATION RECORDING AND REPRODUCING APPARATUS

(75) Inventors: Sachiko Tanabe, Chiba (JP); Norio Chiba, Chiba (JP); Manabu Oumi, Chiba (JP); Masakazu Hirata, Chiba (JP); Yoko Shinohara, Chiba (JP); Yoshikazu Tanaka, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 12/803,561

(22) Filed: Jun. 29, 2010

(65) Prior Publication Data

US 2011/0007612 A1    Jan. 13, 2011

(30) Foreign Application Priority Data

Jul. 3, 2009  (JP) ................................. 2009-159127
May 10, 2010 (JP) ................................. 2010-108737

(51) Int. Cl.
*G11B 11/00* (2006.01)

(52) U.S. Cl. .................. 369/13.33; 360/245.3

(58) Field of Classification Search .............. 369/13.33, 369/13.32, 13.13, 13.12; 360/245.3–245.5
See application file for complete search history.

(56) References Cited

U.S. PATENT DOCUMENTS

| 2009/0323223 A1* | 12/2009 | Hirata et al. | 360/245.3 |
| 2010/0085664 A1* | 4/2010 | Hirata et al. | 360/245.4 |
| 2010/0091619 A1* | 4/2010 | Hirata et al. | 369/13.24 |
| 2010/0284252 A1* | 11/2010 | Hirata et al. | 369/13.33 |

OTHER PUBLICATIONS

Patent Abstracts of Japan, publication No. 2008-310865, publication date Dec. 25, 2008.
Patent Abstracts of Japan, publication No. 2009-004006, publication date Jan. 8, 2009.
Patent Abstracts of Japan, publication No. 2008-130165, publication date Jun. 5, 2008.
Patent Abstracts of Japan, publication No. 07-192421, publication date Jul. 28, 1995.

* cited by examiner

*Primary Examiner* — Thang Tran
(74) *Attorney, Agent, or Firm* — Adams & Wilks

(57) ABSTRACT

There are provided a head gimbal assembly and an information recording and reproducing apparatus capable of easily positioning a light guiding portion and a slider on a tongue portion and performing a stable recording and reproducing operation. A head gimbal assembly recording information on a recording medium using a near-field light includes: a suspension that extends along a surface of the recording medium so as to be deflectable in a thickness direction; a support portion that is provided at a tip end side of the suspension so as to be more deflectable in the thickness direction than the suspension; a light guiding portion that has a support-facing portion provided to the support portion so as to face the support portion and introduces a light flux used for generating the near-field light; and a 3-dimensional structure that is provided to the support portion and used for positioning the support-facing portion on a desired portion of the support portion, wherein the support-facing portion has a portion in which a width of a sectional surface thereof perpendicular in a longitudinal direction of the suspension is larger than a width of a contact surface that makes contact with the support portion.

21 Claims, 16 Drawing Sheets

FIG. 1
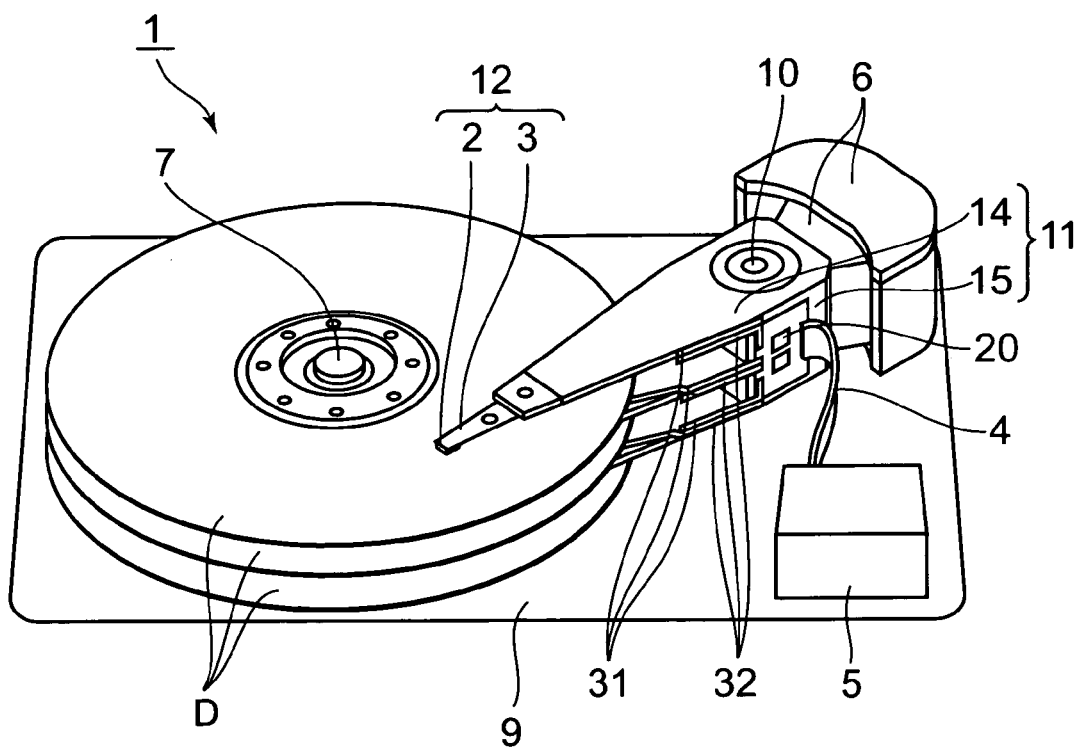
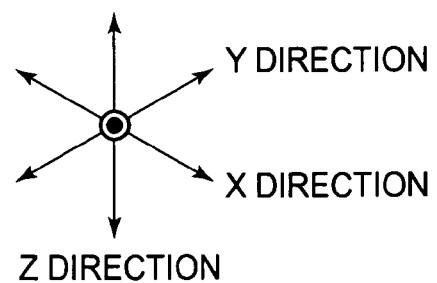

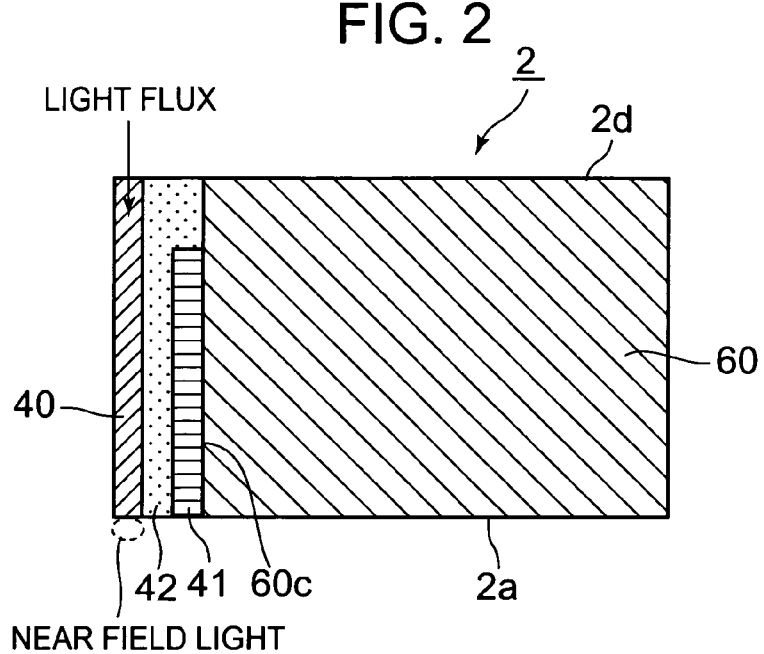
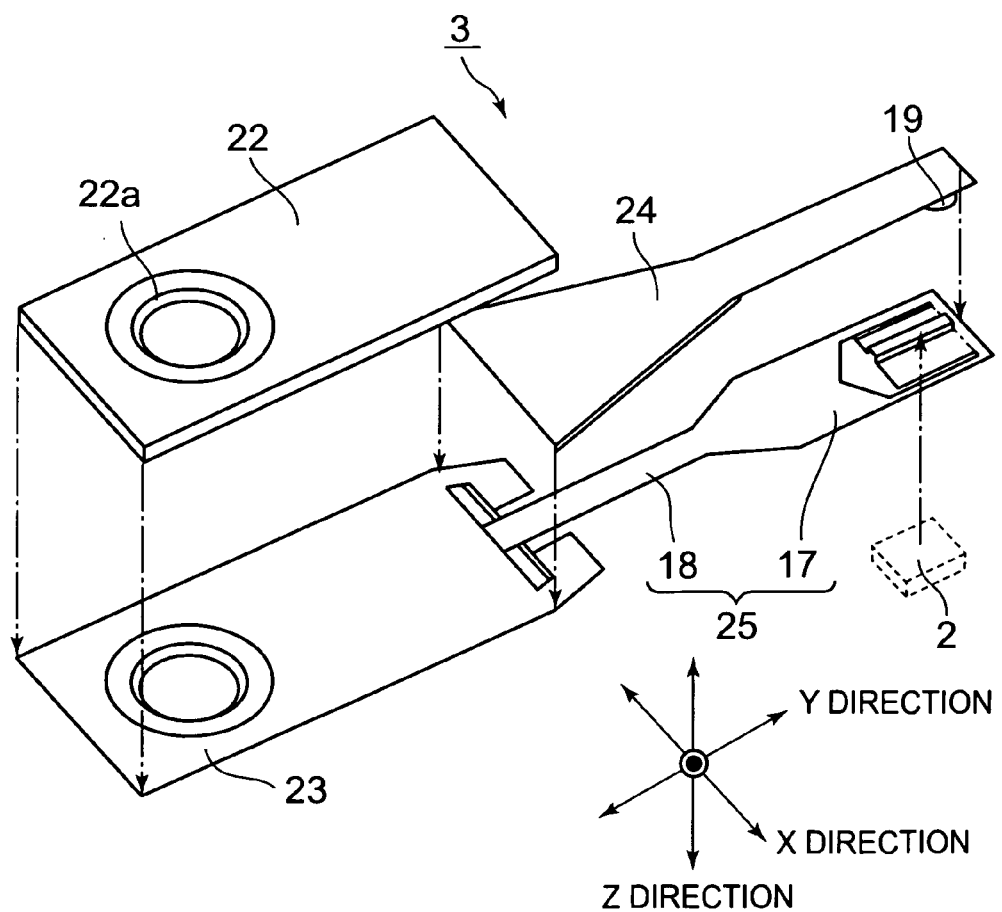

FIG. 5A
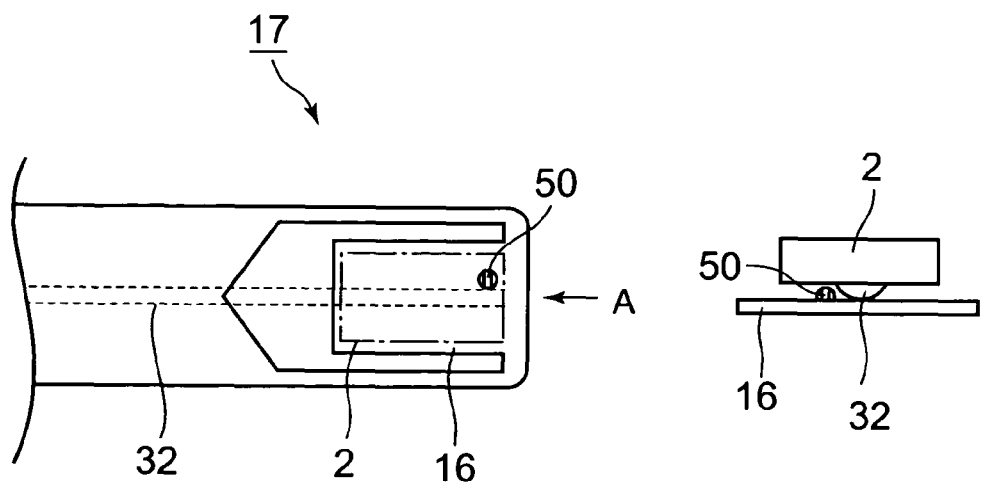
FIG. 5B
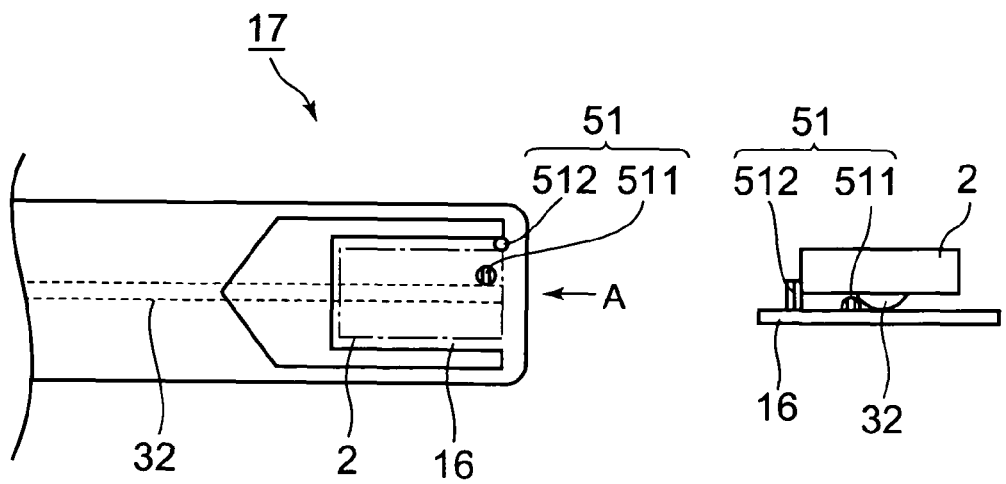
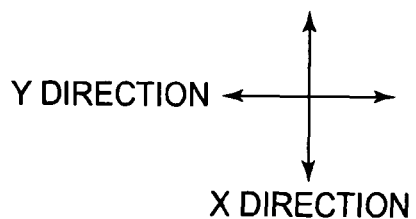
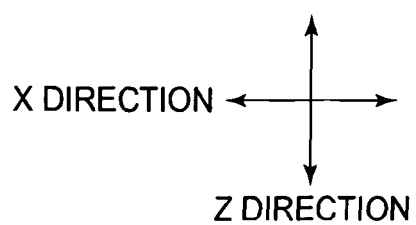

FIG. 6A
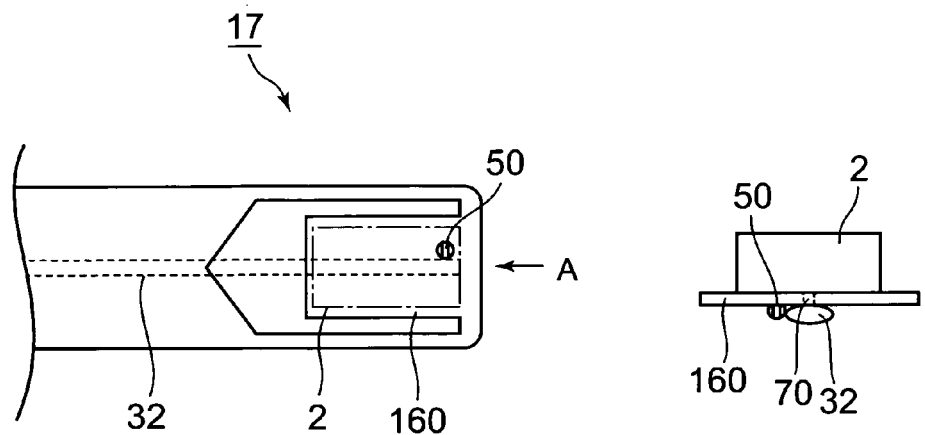
FIG. 6B
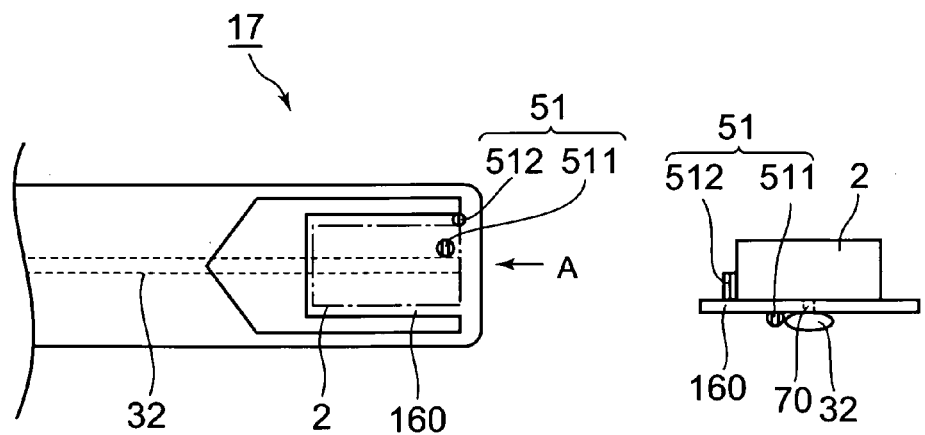
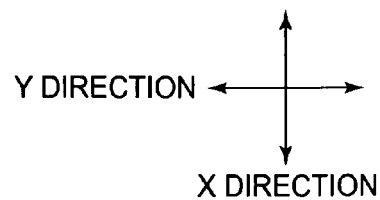
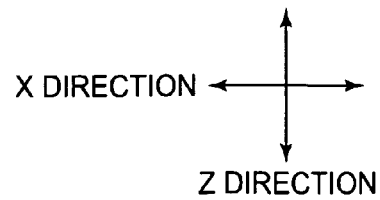

FIG. 9A
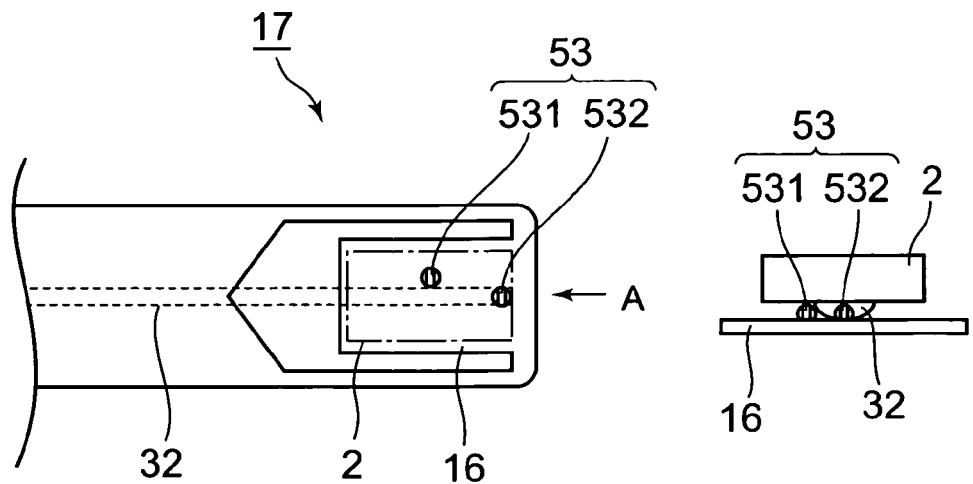
FIG. 9B
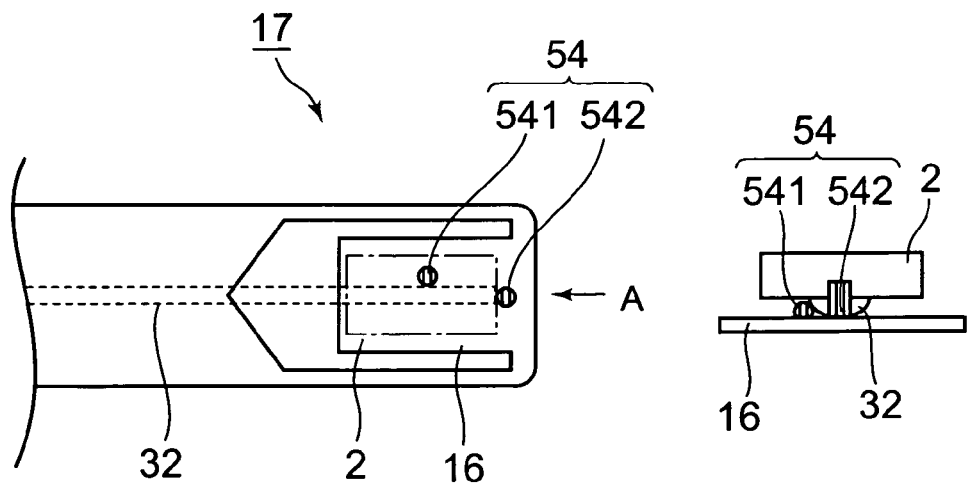
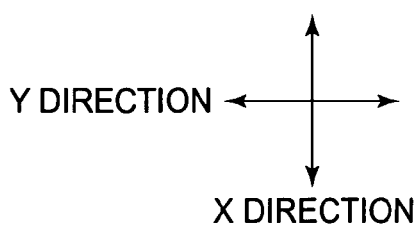
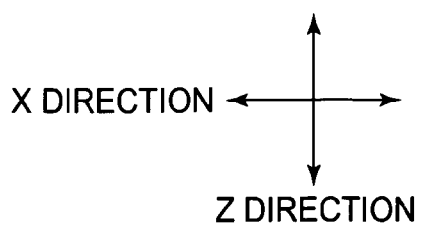

FIG. 11
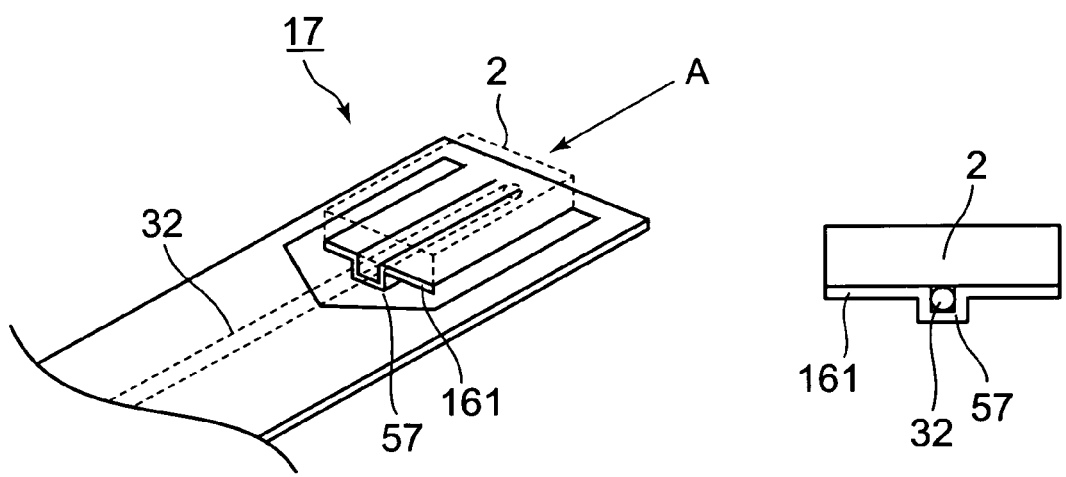
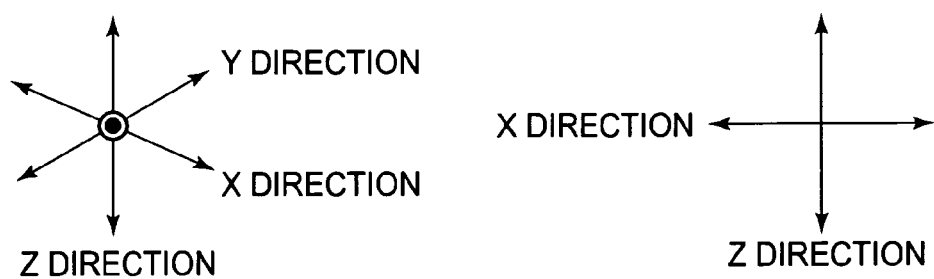

FIG. 12
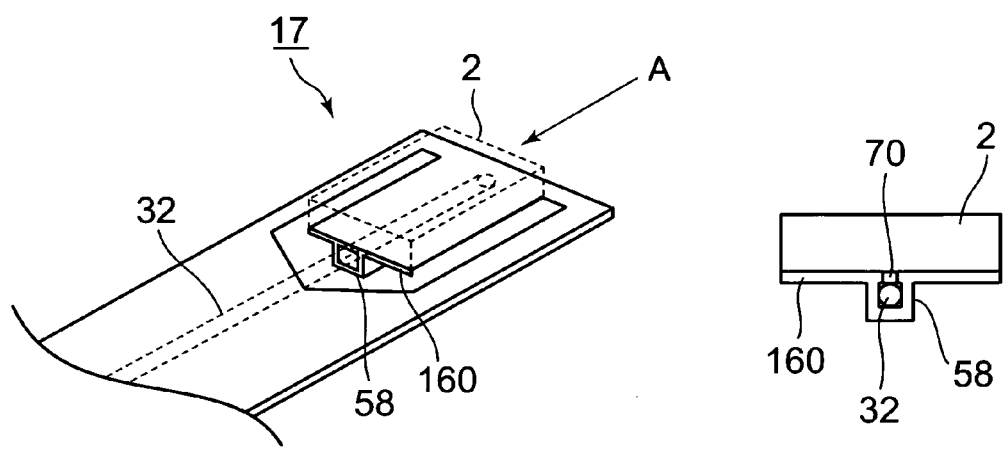
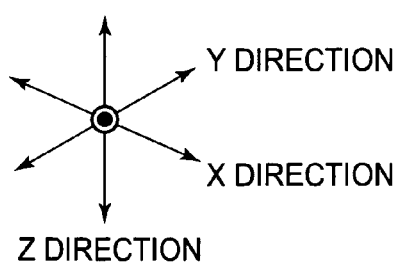
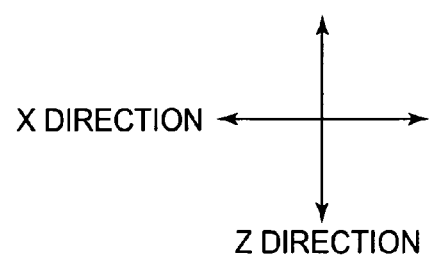

FIG. 14A
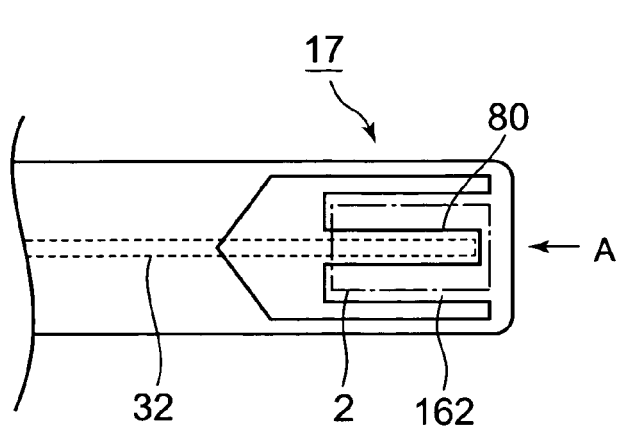
FIG. 14B
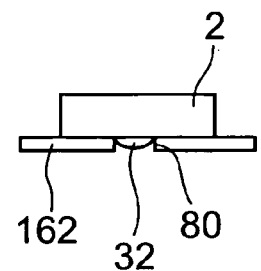
FIG. 14C
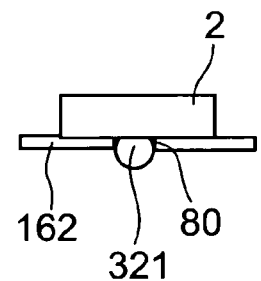
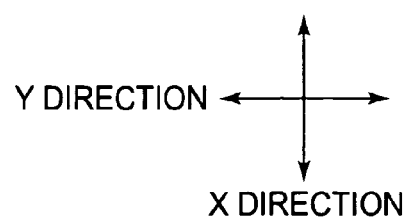
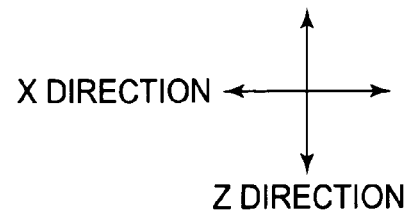

FIG. 16
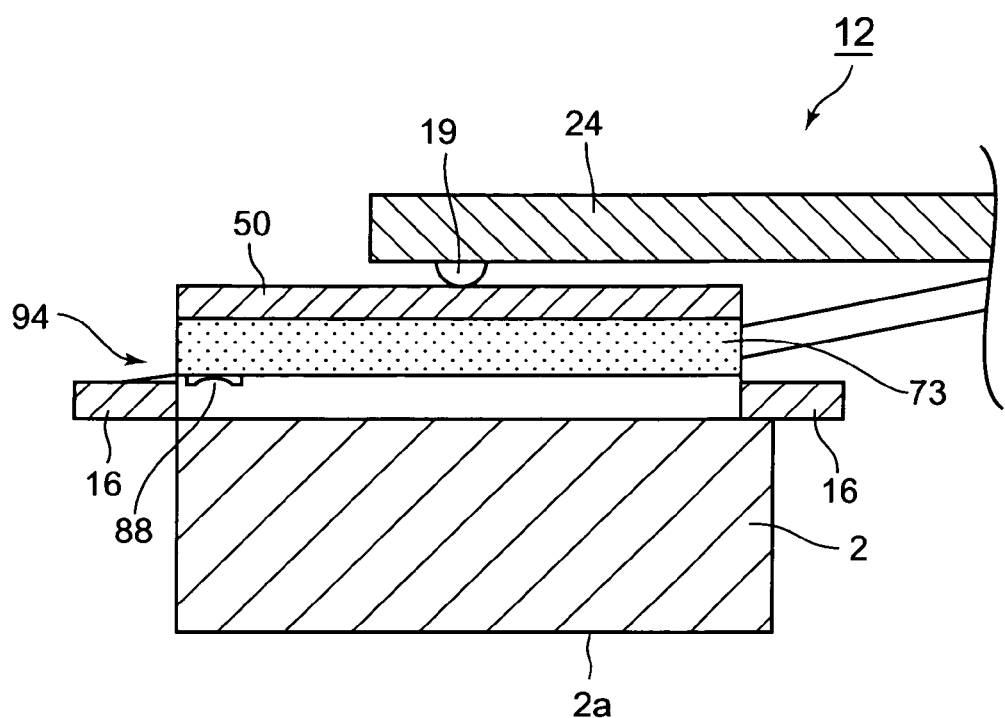
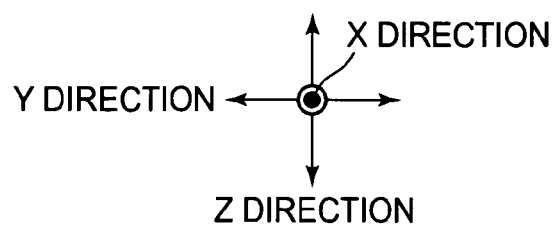

FIG. 18
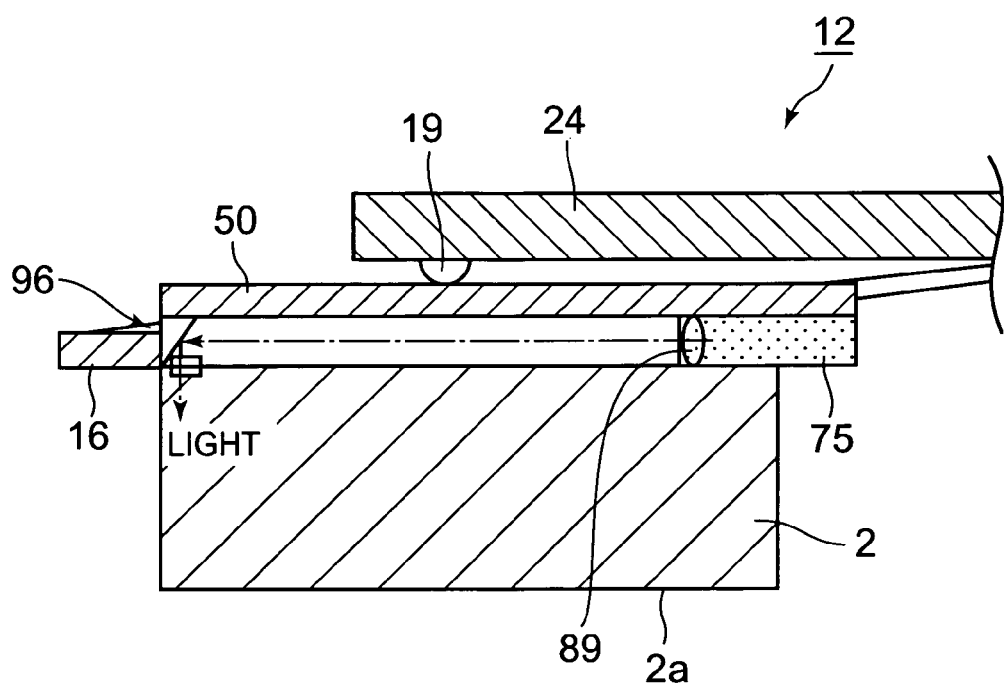
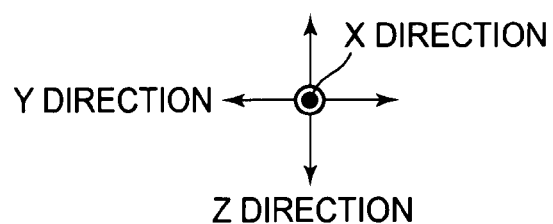

HEAD GIMBAL ASSEMBLY AND INFORMATION RECORDING AND REPRODUCING APPARATUS

BACKGROUND OF THE INVENTION

1. Field of the Invention

The present invention relates to a head gimbal assembly and an information recording and reproducing apparatus that records and reproduces various kinds of information on and from a recording medium using a focused spot beam.

2. Related Art

In recent years, a recording medium (hereinafter referred to as a disk) such as a hard disk of a computer device is facing a need for realizing recording and reproduction of high-volume and high-density information and having a further higher density is being demanded. Therefore, in order to minimize the influence of neighboring magnetic domains or thermal fluctuation, disks having strong retention force have begun to be used. Therefore, it has been difficult to record information on such disks.

In order to solve inconveniences such as those mentioned above, an information recording and reproducing apparatus has been proposed which uses a hybrid magnetic recording method of locally heating magnetic domains using near-field light to weaken the retention force temporarily and writing data to a disk during the temporary period. Particularly, the use of near-field light enables heating an area that is equal to or smaller than the wavelength of light which was regarded as a limit in a conventional optical system. Therefore, it is possible to achieve a higher density exceeding the number of recordable bits of a magnetic recording and reproducing apparatus of the related art.

An information recording and reproducing apparatus using the hybrid magnetic recording method is proposed in a variety of forms. One example thereof is an information recording and reproducing apparatus in which a light guiding portion guides light from a light source at an outer side of a slider and supplies the light to a near-field optical head provided on the slider, thus generating sufficiently large near-field light from a very small optical aperture. Therefore, the information recording and reproducing apparatus is capable of realizing superhigh-resolution and high-speed recording and reproduction and a high SN ratio. In this information recording and reproducing apparatus, the slider having the near-field optical head scans over the disk to be positioned at a desired position on the disk. Thereafter, information can be recorded on the disk by the collaboration of the near-field light radiated from the near-field optical head and a recording magnetic field generated from the slider. Among such apparatuses, there is known a configuration in which the near-field optical head is disposed at a tip end surface (trading edge) side of the slider in order to decrease the distance between the disk surface and the near-field optical head further.

As a configuration for supply a light flux to the near-field optical head, as disclosed in JP-A-2008-310865 or JP-A-2009-4006, a structure is known in which the slider and the light guiding portion are fixed to a suspension in which a notch or an optical aperture is formed, and the light flux emitted from the light source is guided to the near-field optical head by the light guiding portion.

However, in the information recording and reproducing apparatus using the hybrid magnetic recording method disclosed in JP-A-2008-310865 and JP-A-2009-4006, the suspension does not have structures, such as a flexure or a tongue portion, which is indispensable for properly maintaining a very small flying height. Therefore, it is difficult with such a structure to properly control the pressure that suppresses the air bearing force of the slider. In addition, there is a possibility that the recording and reproducing operation is not performed stably.

Meanwhile, the information recording and reproducing apparatus disclosed in JP-A-2008-130165 has a suspension structure which has a flexure or a tongue portion. Therefore, it is possible to stably levitate the slider. However, the light guiding portion or the slider must be disposed on the tongue portion which is easily deflectable in the thickness direction thereof. Therefore, there was a problem in that it is difficult to dispose the light guiding portion or the slider.

In addition, in the information recording and reproducing apparatus disclosed in JP-A-7-192421, a positioning mechanism is provided to both the slider and the tongue portion in order to facilitate disposition of the slider on the tongue portion which is easily deflectable in the thickness direction. However, in an information recording and reproducing apparatus using the hybrid magnetic recording method, it is necessary to dispose optical components such as an optical fiber or a laser unit in addition to the slider. Moreover, in many cases, such optical components have a small surface size on a surface facing the tongue portion. Therefore, there was a problem in that the optical components are likely to roll over the tongue portion when they are mounted on the tongue portion, and positioning of the optical components is difficult.

SUMMARY OF THE INVENTION

The present invention has been made in view of the foregoing, and an object of the present invention is to provide a head gimbal assembly and an information recording and reproducing apparatus capable of easily positioning a light guiding portion and a slider on a tongue portion and performing a stable recording and reproducing operation.

The present invention provides the following means in order to solve the problems.

According to an aspect of the present invention, there is provided a head gimbal assembly that records information on a recording medium using a near-field light, the head gimbal assembly including: a suspension that extends along a surface of the recording medium so as to be deflectable in a thickness direction; a support portion that is provided at a tip end side of the suspension so as to be more deflectable in the thickness direction than the suspension; a light guiding portion that has a support-facing portion provided to the support portion so as to face the support portion and introduces a light flux used for generating the near-field light; and a 3-dimensional structure that is provided to the support portion and used for positioning the support-facing portion on a desired portion of the support portion, wherein the support-facing portion has a portion in which a width of a sectional surface thereof perpendicular in a longitudinal direction of the suspension is larger than a width of a contact surface that makes contact with the support portion.

According to the head gimbal assembly according to the above aspect of the present invention, the support portion which is more easily deflectable in the thickness direction of the suspension than the suspension is provided at the tip end portion of the suspension, and the slider is provided to the support portion. With this configuration, when the head gimbal assembly of the present invention is used as a part of an information recording and reproducing apparatus, it is possible to properly control the pressure that suppresses levitation. Therefore, it is possible to perform a stable recording and reproducing operation. Moreover, since the support portion is easily deflectable in the thickness direction, it is difficult to achieve positioning of the support-facing portion including the light guiding portion. However, the 3-dimensional structure for achieving positioning of the support-facing portion is provided. Therefore, it is possible to easily dispose the support-facing portion on the support portion. Furthermore, the surface area of the light guiding portion facing the support portion is small. Therefore, the light guiding portion rolls on the support portion when the support-facing portion of the light guiding portion is disposed on the support portion. Therefore, it is difficult to position the support-facing portion on the support portion. However, by providing the 3-dimensional structure on the support portion, it is possible to prevent rolling of the light guiding portion. Therefore, it is possible to easily dispose the support-facing portion on the support portion.

In the head gimbal assembly according to the above aspect of the present invention, the support-facing portion may have a curved surface.

According to the head gimbal assembly according to the above aspect of the present invention, even when the support-facing portion is a curved surface, it is possible to easily achieve positioning of the light guiding portion and the support portion.

In the head gimbal assembly according to the above aspect of the present invention, the 3-dimensional structure may be formed to be integral with the support portion and may be configured by deforming the support portion.

According to the head gimbal assembly according to the above aspect of the present invention, the 3-dimensional structure is formed to be integral with the support portion by deforming the support portion. With this configuration, it is possible to eliminate a step of forming a 3-dimensional structure separately, a step of positioning the 3-dimensional structure formed separately on the support portion, and a step of fixing the 3-dimensional structure to the support portion. Therefore, it is possible to form a positioning mechanism of the light guiding portion and the support portion at a low cost. In addition, it is possible to easily form the positioning mechanism of the light guiding portion and the support portion.

In the head gimbal assembly according to the above aspect of the present invention, the head gimbal assembly may include a slider that is disposed on a tip end side of the suspension so as to face the surface of the recording medium and generates the near-field light using the light flux, and the 3-dimensional structure may be used for positioning the slider on a desired portion of the support portion.

According to the head gimbal assembly according to the above aspect of the present invention, it is not only possible to easily position the light guiding portion on the support portion, but also to easily position the slider on the support portion.

In the head gimbal assembly according to the above aspect of the present invention, the 3-dimensional structure may have a convex portion.

According to the head gimbal assembly according to the above aspect of the present invention, the 3-dimensional structure for achieving positioning of the support-facing portion is configured as a convex portion. With this configuration, the support-facing portion can be positioned so as to be aligned along the convex portion. Therefore, it is possible to perform the disposing of the support-facing portion more easily.

In the head gimbal assembly according to the above aspect of the present invention, a plurality of the convex portions may be provided, and the support-facing portion may be disposed between the respective convex portions.

According to the head gimbal assembly according to the above aspect of the present invention, a plurality of convex portions which is the 3-dimensional structure is provided. With this configuration, the support-facing portion can be disposed on the support portion by aligning the support-facing portion along the plurality of convex portions. Therefore, even when the support portion is greatly deformed in the thickness direction, it is possible to easily dispose the support-facing portion on the support portion.

In the head gimbal assembly according to the above aspect of the present invention, a part of the 3-dimensional structure may have a function of positioning the support-facing portion on a desired portion of the support portion in a width direction of the suspension, and a remaining part of the 3-dimensional structure may have a function of positioning the support-facing portion on a desired portion of the support portion in a longitudinal direction of the suspension.

According to the head gimbal assembly according to the above aspect of the present invention, a part of the 3-dimensional structure has a function of achieving positioning of the support-facing portion in the width direction of the suspension. Moreover, the other 3-dimensional structure has a function of achieving positioning of the support-facing portion in the longitudinal direction of the suspension. With this configuration, the positioning of the support-facing portion on the support portion in the longitudinal direction of the suspension and the width direction of the suspension can be performed easily at the same time.

In the head gimbal assembly according to the above aspect of the present invention, the 3-dimensional structure may have an elongated portion, and the support-facing portion may be disposed on a lateral side of the elongated portion.

According to the head gimbal assembly according to the above aspect of the present invention, the 3-dimensional structure includes the elongated portion that extends in a predetermined direction. With this configuration, it is possible to dispose the support-facing portion while sliding the support-facing portion along the elongated portion. Therefore, even when the support portion is greatly deflected in the thickness direction, it is possible to easily dispose the support-facing portion on the support portion.

In the head gimbal assembly according to the above aspect of the present invention, the 3-dimensional structure may include a support-facing portion-fixing portion to which the support-facing portion is fitted.

According to the head gimbal assembly according to the above aspect of the present invention, the support portion includes a 3-dimensional structure to which the support-facing portion is fitted. With this configuration, even when the support-facing portion does not have a sufficient surface area to an extent that it can be fixed to the support portion, the disposing and fixing of the support-facing portion with respect to the support portion can be performed easily.

In the head gimbal assembly according to the above aspect of the present invention, the support-facing portion-fixing portion may be configured so that a width of a portion of the support-facing portion-fixing portion is approximately the same as a width of the support-facing portion.

According to the head gimbal assembly according to the above aspect of the present invention, the width of the support-facing portion-fixing portion is approximately the same as the width of the support-facing portion. With this configuration, when the support-facing portion is disposed on the support portion, the disposition in the width direction of the suspension can be performed in an easier and accurate manner.

In the head gimbal assembly according to the above aspect of the present invention, an inner shape of the support-facing portion-fixing portion may have approximately the same shape as a sectional outer shape of a surface perpendicular to a longitudinal direction of the support-facing portion.

According to the head gimbal assembly according to the above aspect of the present invention, the support-facing portion-fixing portion has approximately the same shape as the outer shape of the support-facing portion. With this configuration, since the support-facing portion can be more firmly fixed to the support-facing portion-fixing portion, it is possible to dispose the support-facing portion in an easier and reliable manner.

In the head gimbal assembly according to the above aspect of the present invention, the 3-dimensional structure may include a base portion and a plate connected to the base portion, the plate may have two divided parts extending in a predetermined direction from the base portion, and the support-facing portion may be disposed between the respective divided parts.

According to the head gimbal assembly according to the above aspect of the present invention, the support portion has a notch. With this configuration, it is possible to dispose the support-facing portion using the notch portion as a mark. Therefore, the positioning of the support portion and the support-facing portion can be performed easily.

In the head gimbal assembly according to the above aspect of the present invention, an entirety of the light guiding portion may be a laser unit.

According to the head gimbal assembly according to the above aspect of the present invention, even when the light guiding portion is configured as a laser unit in which a light guiding function or a focusing function is incorporated, the positioning of the support portion and the support-facing portion can be performed easily.

In the head gimbal assembly according to the above aspect of the present invention, a part of the light guiding portion may be a laser unit.

According to the head gimbal assembly according to the above aspect of the present invention, even when the light guiding portion is configured as a laser unit to which a light guiding function or a focusing function is associated, the positioning of the support portion and the support-facing portion can be performed easily.

In the head gimbal assembly according to the above aspect of the present invention, the entirety of the light guiding portion may be provided on a surface of the slider opposite to a air bearing surface of the slider.

According to the head gimbal assembly according to the above aspect of the present invention, even when the light guiding portion is provided on the surface opposite to the air bearing surface of the slider, the positioning of the support portion and the support-facing portion can be performed easily.

In the head gimbal assembly according to the above aspect of the present invention, laser unit of the light guiding portion may be provided at a position distant from the slider.

According to the head gimbal assembly according to the above aspect of the present invention, even when the laser unit is provided at a position distant from the slider, the positioning of the support portion and the support-facing portion can be performed easily.

In the head gimbal assembly according to the above aspect of the present invention, the light guiding portion may have a lens that adjusts the beam spot shape and position of a light flux emitted from the laser unit.

According to the head gimbal assembly according to the above aspect of the present invention, the light guiding portion has a lens that adjusts an outgoing spot beam from the laser unit of the light guiding portion. With this configuration, even when a spot beam emitted from the laser unit is not identical to the shape of an incidence port on which the spot beam is incident, it is possible to make the shapes identical to each other by adjusting the outgoing spot beam with the lens. Therefore, it is possible to improve optical efficiency. Furthermore, even when such a lens is provided, the positioning of the support portion and the support-facing portion can be performed easily.

In the head gimbal assembly according to the above aspect of the present invention, the laser unit may have a lens that adjusts the beam spot shape and position of a light flux emitted therefrom.

According to the head gimbal assembly according to the above aspect of the present invention, the laser unit has a lens that adjusts an outgoing spot beam from the laser unit. With this configuration, even when a spot beam emitted from the laser unit is not identical to the shape of an incidence port on which the spot beam is incident, it is possible to make the shapes identical to each other by adjusting the outgoing spot beam with the lens. Therefore, it is possible to improve optical efficiency. Furthermore, even when such a lens is provided, the positioning of the support portion and the support-facing portion can be performed easily.

In the head gimbal assembly according to the above aspect of the present invention, the head gimbal assembly includes a slider that is disposed on a tip end side of the suspension so as to face the surface of the recording medium and generates the near-field light using the light flux, and the lens is disposed so that an optical axis of light passing through the lens is perpendicular to a air bearing surface of the slider.

According to the head gimbal assembly according to the above aspect of the present invention, it is possible to adjust the shape of the spot beam when the optical axis of the light flux is perpendicular to the air bearing surface of the slider. Furthermore, even when the lens is disposed so as to be able to adjust such a spot beam, the positioning of the support portion and the support-facing portion can be performed easily.

In the head gimbal assembly according to the above aspect of the present invention, the head gimbal assembly may include a slider that is disposed on a tip end side of the suspension so as to face the surface of the recording medium and generates the near-field light using the light flux, and the lens may be disposed so that an optical axis of light passing through the lens is parallel to a air bearing surface of the slider.

According to the head gimbal assembly according to the above aspect of the present invention, it is possible to adjust the shape of the spot beam when the optical axis of the light flux is parallel to the air bearing surface of the slider. Furthermore, even when the lens is disposed so as to be able to adjust such a spot beam, the positioning of the support portion and the support-facing portion can be performed easily.

According to another aspect of the present invention, there is provided an information recording and reproducing apparatus including: a head gimbal assembly that records information on a recording medium using a near-field light and includes: a suspension that extends along a surface of the recording medium so as to be deflectable in a thickness direction; a support portion that is provided at a tip end side of the suspension so as to be more deflectable in the thickness direction than the suspension; a light guiding portion that has a support-facing portion provided to the support portion so as to face the support portion and introduces a light flux used for generating the near-field light; and a 3-dimensional structure that is provided to the support portion and used for positioning the support-facing portion on a desired portion of the support portion, wherein the support-facing portion has a portion in which a width of a sectional surface thereof perpendicular in a longitudinal direction of the suspension is larger than a width of a contact surface that makes contact with the support portion; a slider that is disposed on a tip end side of the suspension so as to face the surface of the recording medium and generates the near-field light using the light flux; a pivot shaft that rotatably supports the head gimbal assembly; and a control unit that controls rotation of the head gimbal assembly about the pivot shaft.

According to the information recording and reproducing apparatus according to the above aspect of the present invention, the head gimbal assembly having the 3-dimensional structure for positioning the support-facing portion on the support portion of the suspension is used. With this configuration, it is possible to easily position the support-facing portion on the support portion. Therefore, it is possible to simplify the step of assembling the information recording and reproducing apparatus. Furthermore, the support-facing portion can be properly disposed on the support portion. Therefore, when the information recording and reproducing apparatus is operated as an information recording apparatus, it is possible to stabilize levitation of the slider. Accordingly, it is possible to provide an information recording and reproducing apparatus capable of performing a stable recording and reproducing operation.

According to the head gimbal assembly according to the above aspect of the present invention, the support portion which is more easily deflectable in the thickness direction of the suspension than the suspension is provided at the tip end portion of the suspension. With this configuration, when the head gimbal assembly having the slider on the support portion is used as a part of an information recording and reproducing apparatus, it is possible to properly control the pressure that suppresses levitation. Therefore, it is possible to perform a stable recording and reproducing operation. Moreover, the support portion is easily deflectable in the thickness direction, and it is difficult to achieve positioning of the support-facing portion including the light guiding portion. However, by providing the 3-dimensional structure for achieving positioning of the support-facing portion, it is possible to easily dispose the support-facing portion on the support portion. Furthermore, when the support-facing portion of the light guiding portion is disposed on the support portion, the light guiding portion and the support portion have a small contact area. Therefore, when the support-facing portion of the light guiding portion is disposed on the support portion, the light guiding portion rolls on the support portion, and it is difficult to position the support-facing portion on the support portion. However, by providing the 3-dimensional structure on the support portion, it is possible to prevent rolling of the support-facing portion. Therefore, it is possible to easily dispose the support-facing portion on the support portion.

BRIEF DESCRIPTION OF THE DRAWINGS

FIG. 1 is a view showing a configuration of an information recording and reproducing apparatus 1 according to a first embodiment of the present invention.

FIG. 2 is an enlarged sectional view of a slider 2 shown in FIG. 1.

FIG. 3 is an exploded perspective view showing each part of a suspension 3 shown in FIG. 1.

FIGS. 5A and 5B are top plan views (the left figures) of a tip end portion of the gimbal 17, the slider 2, and a light guiding portion 32 and are side views (the right figures) as viewed from the arrow A in the left figures.

FIGS. 6A and 6B are top plan views (the left figures) of the tip end portion of the gimbal 17, the slider 2, and the light guiding portion 32 according to a second embodiment and are side views (the right figures) as viewed from the arrow A in the left figures.

FIGS. 9A and 9B are top plan views (the left figures) of the tip end portion of the gimbal 17, the slider 2, and the light guiding portion 32 according to a fifth embodiment and are side views (the right figures) as viewed from the arrow A in the left figures.

FIG. 11 is a perspective view (the left figure) of the tip end portion of the gimbal 17, the slider 2, and the light guiding portion 32 according to a seventh embodiment and is a side view (the right figure) as viewed from the arrow A in the left figure.

FIG. 12 is a perspective view (the left figure) of the tip end portion of the gimbal 17, the slider 2, and the light guiding portion 32 according to an eighth embodiment and is a side view (the right figure) as viewed from the arrow A in the left figure.

FIGS. 14A, 14B, and 14C are a top plan view (the left figure) of the tip end portion of the gimbal 17, the slider 2, and the light guiding portion 32 or 321 according to a tenth embodiment and are side views (the right figures) as viewed from the arrow A in the left figures.

FIG. 16 is a sectional view of the head gimbal assembly 12 according to a twelfth embodiment.

FIG. 18 is a sectional view of the head gimbal assembly 12 according to a fourteenth embodiment.

DETAILED DESCRIPTION OF THE INVENTION

First Embodiment

Information Recording and Reproducing Apparatus

Figure 4:
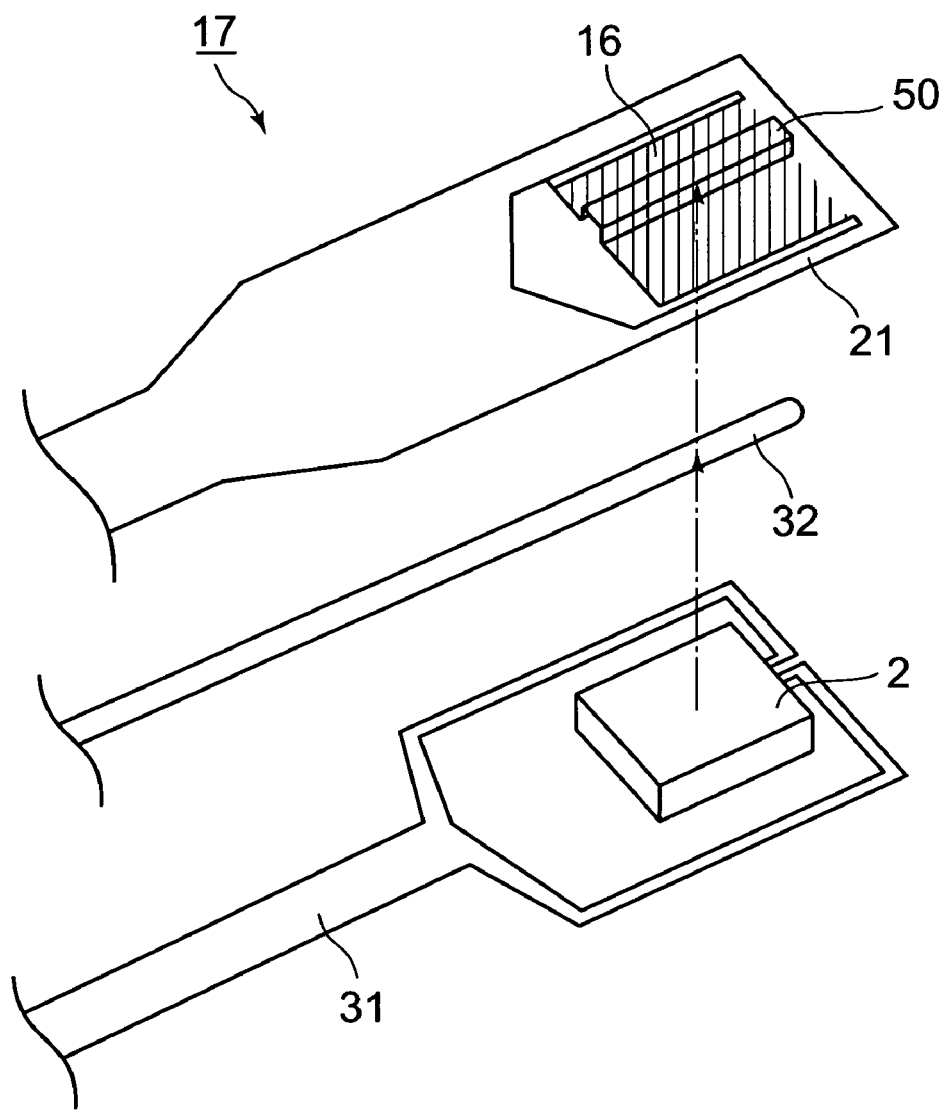
FIG. 4 is an enlarged perspective view of a gimbal 17 shown in FIG. 3, also showing a member that is fixed to the gimbal 17.

Hereinafter, a first embodiment according to the present invention will be described with reference to FIG. 1 to FIG. 5. FIG. 1 is a view showing a configuration of an information recording and reproducing apparatus 1 according to a first embodiment of the present invention. The information recording and reproducing apparatus 1 according to the present embodiment is an apparatus that performs recording on a disk (recording medium) D having a perpendicular recording layer by a perpendicular recording method.

The information recording and reproducing apparatus 1 according to the present embodiment includes a carriage 11, a laser unit 20, a head gimbal assembly (HGA) 12, an actuator 6, a spindle motor 7, a control unit 5, and a housing (not shown) in which the respective constituent components are accommodated.

The laser unit 20 supplies a light flux from a base end side of the carriage 11.

The head gimbal assembly (HGA) 12 is supported on a tip end side of the carriage 11. The head gimbal assembly (HGA) 12 includes a suspension 3 and a slider 2. The slider 2 is formed at the tip end of the suspension 3.

The actuator 6 causes the head gimbal assembly 12 to scan and move in an X-Y direction parallel to the surface of the disk D.

The spindle motor 7 rotates the disk D in a predetermined direction.

The control unit 5 is connected to the laser unit 20 via a wiring 4. The control unit 5 supplies electrical current modulated in accordance with information to the slider 2.

The housing is a box-like member having an upper optical aperture and made from metallic material such as aluminum. The housing includes a bottom portion 9 having a rectangular shape in top view and a peripheral wall (not shown) erected on the periphery of the bottom portion 9 in a direction perpendicular to the bottom portion 9. In addition, a concave portion is formed at an inner side surrounded by the peripheral wall so as to accommodate the respective constituent components and the like. In FIG. 1, for better understanding of the figure, the peripheral wall surrounding the periphery of the housing is omitted. In addition, a lid not shown is detachably fixed to the housing so as to close the optical aperture of the housing. The spindle motor 7 is mounted approximately at the center of the bottom portion 9. The disk D is detachably fixed when a central hole thereof is fitted into the spindle motor 7.

The actuator 6 is mounted at the outer side of the disk D, namely a corner of the bottom portion 9. The carriage 11 is attached to the actuator 6 so as to be pivotable in the X-Y direction about a pivot shaft 10. The carriage 11 is a member in which arm portions 14 and a base portion 15 are integrally formed by grinding or the like. The arm portions 14 extend along the surface of the disk D from the base end portion of the carriage 11 toward the tip end portion thereof. The base portion 15 supports the arm portions 14 via the base end portion of the carriage 11 in a cantilever-like manner.

The base portion 15 is supported to be pivotable about the pivot shaft 10. That is, the base portion 15 is connected to the actuator 6 via the pivot shaft 10. The pivot shaft 10 serves as the center of rotation of the carriage 11.

The arm portions 14 are formed in a tapered form as they extend from their base end portion toward their tip end portion. The disk D is disposed to be sandwiched between the arm portions 14. That is, the arm portions 14 and the disk D are disposed so as to cross each other. The arm portions 14 are movable in a direction (X-Y direction) parallel to the surface of the disk D by the driving of the actuator 6. The carriage 11 and the head gimbal assembly 12 are retracted from the position on the disk D by the driving of the actuator 6 when the disk D stops rotating.

Head Gimbal Assembly

In the head gimbal assembly 12, the light flux which is emitted from the laser unit 20 and guided via a light guiding portion 32 to be incident to the slider 2 is generated from the tip end of the slider 2 as near-field light. The head gimbal assembly 12 records and reproduces various kinds of information on and from the disk D using the near-field light. In addition, the head gimbal assembly 12 has a function of slightly levitating the slider 2 from the disk D.

In the head gimbal assembly 12 according to the present embodiment, the light guiding portion 32 and an electrical wiring 31 are connected at a position adjacent to the slider 2. The light guiding portion 32 guides the light flux from the laser unit 20 to the slider 2. The electrical wiring 31 supplies electrical current for operating a recording element 42, a reproducing element 41, or the like, described later, which is provided to the slider 2.

The suspension 3 for fixing the slider 2 is provided with the light guiding portion 32 and the electrical wiring 31 interposed therebetween.

Slider

The slider 2 is disposed between the disk D and the suspension 3, and is supported on the lower surface of the suspension 3 with a gimbal 17 interposed therebetween. FIG. 2 is an enlarged sectional view of the slider 2 as viewed from the X direction. The slider 2 is disposed so as to face the disk D in a state of being levitated by a predetermined distance from the surface of the disk D (see FIG. 1). The slider 2 includes a slider substrate 60, a recording element 42, a reproducing element 41, and a near-field light generating element 40. The slider substrate 60 has an air bearing surface 2a that faces the surface of the disk D. The recording element 42 is provided to a tip end surface 60c of the slider substrate 60. In the near-field light generating element 40, the light flux supplied from the light guiding portion 32 (see FIG. 2) is emitted from a disk D side as near-field light.

Here, the disposition of the recording element 42, the near-field light generating element 40, and the reproducing element 41 is not limited to this. For example, the reproducing element 41 may be disposed at the tip end surface 60c of the slider substrate 60, and the recording element 42 and the near-field light generating element 40 may be sequentially disposed to be adjacent thereto.

The bottom surface of the slider 2 (the slider substrate 60) serves as a air bearing surface 2a that faces the surface of the disk D as described above. The air bearing surface 2a is a surface that produces a levitation pressure from the viscosity of airflow generated by the rotating disk D and is called an air bearing surface (ABS).

Suspension

FIG. 3 is an exploded perspective view showing each part of the suspension 3 as viewed from a direction where the slider 2 is provided on the lower side. The suspension 3 includes a base plate 22, a load beam 24, and a flexure 25.

The base plate 22 is formed in an approximately rectangular form in top view. The base plate 22 is made from a thin metallic material such as stainless steel, and an optical aperture 22a is formed at a base end side thereof so as to penetrate therethrough in the thickness direction thereof. The base plate 22 is fixed to the tip ends of the arm portions 14 (see FIG. 1) via the optical aperture 22a. A sheet-like hinge plate 23 made from a metallic material such as stainless steel is disposed on the lower surface of the base plate 22. The hinge plate 23 is a flat plate-like member which is formed over the entire lower surface of the base plate 22. The load beam 24 is connected to a tip end portion of the hinge plate 23.

The load beam 24 is an approximately triangular member in plan view which is connected to a tip end side of the base plate 22 via the hinge plate 23. The load beam 24 is made from a thin metallic material such as stainless steel similarly to the base plate 22. The base end of the base plate 22 is connected to the hinge plate 23 in a state where a gap is formed between the base end and the tip end of the base plate 22. With this configuration, the suspension 3 is easily deflectable in the Z direction perpendicular to the surface of the disk D by being bent about a position between the base plate 22 and the load beam 24.

The flexure 25 is a sheet-like member which is made from a metallic material such as stainless steel. The flexure 25 is configured to exhibit flexural deformation in the thickness direction because it is formed in a sheet form. The flexure 25 includes a gimbal 17 and a support body 18. The gimbal 17 is fixed to the tip end side of the load beam 24. The gimbal 17 has an approximately pentagonal outer shape in top view. The support body 18 is narrower than the gimbal 17. Moreover, the support body 18 is a sheet-like member which is formed to be integral with the gimbal 17. Furthermore, the support body 18 has a portion which is disposed on the suspension 3 so as to extend towards the arm portions 14 (see FIG. 1). That is to say, the support body 18 is configured to follow a deformation of the suspension 3 when the suspension 3 is deformed.

In addition, the gimbal 17 and a protrusion 19 are formed at the tip end of the load beam 24. The protrusion 19 protrudes from the load beam 24 towards the approximate center of the slider 2. The tip end of the protrusion 19 is rounded. The protrusion 19 makes point-contact with the surface (upper surface) of the gimbal 17 when the slider 2 is levitated by an air pressure from the disk D. That is, the protrusion 19 supports the slider 2 via the gimbal 17 and the light guiding portion 32. At the same time, the protrusion 19 applies a load to the slider 2 toward the surface of the disk D (in the Z direction).

Gimbal

FIG. 4 is an enlarged perspective view of the gimbal 17 shown in FIG. 3, also showing a member that is fixed to the gimbal 17. The gimbal 17 includes an arm portion 21 and a support portion 16 which are provided at a tip end portion thereof. The arm portion 21 is branched into two parts at an approximate center of the gimbal 17, which are connected together at the tip end portion. The electrical wiring 31 is branched on the gimbal 17. Moreover, the electrical wiring 31 is led out to the tip end of the gimbal 17 along the arm portion 21 and connected to the tip end portion of the slider. The support portion 16 is provided in an inner empty area of the gimbal 17 surrounded by the arm portion 21. Moreover, the support portion 16 is supported by the arm portion 21 at the tip end of the gimbal 17. The light guiding portion 32 is provided between the slider 2 and the support portion 16. The support portion 16 is provided with a 3-dimensional structure 50 which is used for positioning the light guiding portion 32 and the support portion 16. The light guiding portion 32 is made from optical fiber. A surface of the light guiding portion 32 facing the support portion 16 is configured as a curved surface. The 3-dimensional structure 50 prevents the light guiding portion 32 from rolling on the support portion 16 when disposing the light guiding portion 32, which is difficult to fix and has such a curved surface, in the support portion 16.

Referring to FIGS. 5A and 5B, the left figures are X-Y plan views of the tip end portion of the gimbal 17, the slider 2, and the light guiding portion 32, and the right figures are X-Z plan views as viewed from the arrow A in the left figures. As shown in FIG. 5A, the 3-dimensional structure 50 is a convex, 3-dimensional structure which is provided on the support portion 16 so as to protrude from the support portion 16 towards the slider 2. By disposing the light guiding portion 32 so as to be aligned along the 3-dimensional structure 50, it is possible to properly position the support portion 16 and the light guiding portion 32. In addition, by disposing the light guiding portion 32 to be adjacent to the 3-dimensional structure 50, it is possible to prevent the light guiding portion 32, of which the surface facing the support portion 16 is a curved surface, from rolling thereon when disposing the light guiding portion 32 in the support portion 16. Therefore, it is possible to facilitate the positioning. The 3-dimensional structure 50 does not need to be singular in number, but a number of 3-dimensional structures may be arranged continuously. Moreover, as shown in FIG. 5B, a 3-dimensional structure 51 may include two 3-dimensional structures 511 and 512 so that one 3-dimensional structure 511 positions the light guiding portion 32 and the support portion 16, and the other 3-dimensional structure 512 has a function of achieving positioning of the slider 2.

As described above, the support portion 16 which is more easily deflectable in the thickness direction of the suspension 3 than the suspension 3 is provided at the tip end portion of the suspension 3. Moreover, the slider 2 is provided on the support portion 16. With this configuration, when the head gimbal assembly 12 of the present invention is used as a part of the information recording and reproducing apparatus 1, it is possible to properly control the pressure that suppresses levitation. Therefore, it is possible to perform a stable recording and reproducing operation. Moreover, since the support portion 16 is easily deflectable in the thickness direction, it is difficult to position the light guiding portion 32 or the slider 2 on the support portion 16. However, the 3-dimensional structure 51 for positioning the light guiding portion 32 or the slider 2 is provided. With this configuration, it is possible to easily dispose the light guiding portion 32 or the slider 2 on the support portion 16. Furthermore, since the surface of the light guiding portion 32 facing the support portion 16 has a small contact area where the light guiding portion 32 comes into contact with the support portion 16, the light guiding portion 32 rolls on the support portion 16 when the light guiding portion 32 is disposed on the support portion 16. Therefore, there was a problem in that it is difficult to position the light guiding portion 32 on the support portion 16. However, by providing the 3-dimensional structure 51 on the support portion 16, it is possible to prevent rolling of the light guiding portion 32. Therefore, it is possible to easily dispose the light guiding portion 32 on the support portion 16.

Assembling Method

Next, an assembling flow of the head gimbal assembly 12 configured in this manner will be described below. Basically, the assembling flow follows the conventional flow. However, as for the tip end portion of the head gimbal assembly 12 that is levitated by a very small distance from the disk D, the flying characteristics are greatly influenced by the disposition of the light guiding portion 32 and the slider 2 with respect to the support portion 16. Therefore, when the slider 2 or the light guiding portion 32 is assembled with the support portion 16, it is necessary to perform positioning of these members with high accuracy.

When the light guiding portion 32 is assembled with the support portion 16, as shown in FIG. 5A, the 3-dimensional structure 50 provided on the support portion 16 is used for achieving positioning of the support portion 16 and the light guiding portion 32. The light guiding portion 32 is disposed so as to be aligned along the 3-dimensional structure 50. By doing so, the light guiding portion 32 can be easily disposed at a proper position in the width direction of the head gimbal assembly 12 with respect to the support portion 16. After that, the slider 2 is disposed at a position such that the light flux from the light guiding portion 32 is effectively incident to the slider 2 and is fixed at the position. The disposing and fixing of the slider 2 and the light guiding portion 32 may be performed in advance before the positioning of the light guiding portion 32 and the support portion 16 is performed. However, as shown in FIG. 5B, in the case of the 3-dimensional structure 51 having the function of positioning the slider 2 as well as the light guiding portion 32 on the support portion 16, first, the light guiding portion 32 is positioned on the support portion 16 so as to be aligned along the 3-dimensional structure 511. After that, the slider 2 is positioned so as to be aligned along the 3-dimensional structure 512 and fixed to the support portion 16. The positioning of the slider 2 and the support portion 16 may be performed at the same time as the positioning of the light guiding portion 32 and the support portion 16.

Information Recording and Reproducing Method

Next, the flow of recording and reproducing various kinds of information on and from the disk D by using the head gimbal assembly 12 assembled in this manner will be described below. First, as shown in FIG. 1, the spindle motor 7 is driven to rotate the disk D in a predetermined direction. After that, the actuator 6 is operated to cause the carriage 11 to pivot about the pivot shaft 10. Subsequently, the head gimbal assembly 12 is moved to scan in the X-Y direction by the carriage 11. By these operations, it is possible to position the slider 2 at a desired position on the disk D. At that time, the slider 2 is supported by the suspension 3 and is also pressed towards the disk D by a predetermined force. Simultaneously with this, the slider 2 receives a levitation force by the influence of the air pressure generated by the rotating disk D since the air bearing surface 2a is facing the disk D. By a balance between the two forces, the slider 2 maintains a levitation state at a position separated from the upper surface of the disk D. In addition, an air pressure directed in the X-Y direction is added to the slider 2 due to unevenness or swelling on the disk D. In that case, the slider 2 provided on the support portion 16 of the gimbal 17 is twisted in the two directions of the X and Y axes about the protrusion 19. In this way, it is possible to absorb a Z-directional displacement (a displacement in a direction approximately perpendicular to the surface of the disk D) resulting from the swelling of the disk D. Therefore, the slider 2 assumes a stable posture.

Here, when information is recorded, the control unit 5 operates the laser unit 20. At the same time, the control unit 5 supplies electrical current modulated in accordance with information to the slider 2 and operates the recording element 42.

A light flux emitted from the laser unit 20 travels in the light guiding portion 32 toward the tip end (trading edge) side. The light flux is deflected in a perpendicular direction toward the disk D at the tip end of the light guiding portion 32. The deflected light flux is incident to the near-field light generating element 40 from an upper surface 2d side of the slider 2 as shown in FIG. 2. Moreover, the light flux is emitted as near-field light after passing through the near-field light generating element 40. Then, the disk D is locally heated by the near-field light, and a coercive force thereof is temporarily weakened.

On the other hand, when electrical current is supplied to the slider 2 by the control unit 5 (see FIG. 1), the recording element 42 in the slider 2 is able to generate a recording magnetic field in the perpendicular direction to the disk D.

As a result, information can be recorded by a hybrid magnetic recording method which uses the collaboration of the near-field light generated from the near-field light generating element 40 and the recording magnetic field generated by the recording element 42. In that case, since the recording is performed by a perpendicular recording method, the recording is rarely affected by thermal fluctuation or the like, and a stable recording operation can be performed. Therefore, reliability of the recording can be increased. In addition, a peak position of the heating temperature can be aligned at the position where the recording magnetic field is locally applied. Therefore, in the present embodiment, the recording can be performed reliably. Accordingly, it is possible to achieve an improvement in the reliability and a high recording density.

Next, when information recorded on the disk D is reproduced, the reproducing element 41 receives a magnetic field leaking from the disk D, and the electrical resistance of the reproducing element 41 is changed in accordance with the magnitude of the magnetic field. Thus, the voltage of the reproducing element 41 is changed. In this way, the control unit 5 (see FIG. 1) is able to detect a change in the magnetic field leaking from the disk D as a change in voltage. Then, the control unit 5 is able to perform reproduction of information by reproducing signals from the change in voltage.

In this way, it is possible to record and reproduce various kinds of information on and from the disk D using the slider 2.

Second Embodiment

Next, the present embodiment will be described based on FIGS. 6A and 6B. The present embodiment is different from the first embodiment in terms of the configuration of the tip end portion of the head gimbal assembly 12, and the other configuration is substantially the same as the first embodiment. In the following description, the same configuration as the first embodiment will be denoted by the same reference numerals, and description thereof will be omitted.

FIGS. 6A and 6B show the tip end portion of the gimbal 17, the slider 2, and the light guiding portion 32 according to the second embodiment. The left figures are X-Y plan views, and the right figures are X-Z plan views as viewed from the arrow A in the left figures. As shown in FIG. 6A, in the tip end portion of the head gimbal assembly 12 according to the present embodiment, the light guiding portion 32 and the 3-dimensional structure 50 are provided on a surface of a support portion 160 opposite to the side where the slider 2 is provided. Moreover, an optical optical aperture 70 is formed in a support portion 160. The optical optical aperture 70 allows propagation of the light flux to be incident on the slider 2 after being emitted from the light guiding portion 32. The optical optical aperture 70 is a hole which is formed by cutting the material constituting the support portion 160 or an optical aperture which is made from materials, such as resin or crystal, having good optical propagating efficiency.

Here, as shown in FIG. 6B, the 3-dimensional structure 50 does not need to be singular in number, but may be a plurality of 3-dimensional structures 51 including: the 3-dimensional structure 511 that positions the light guiding portion 32 on the support portion 160; and the 3-dimensional structure 512 that positions the slider 2 on the support portion 160. In that case, the convex shape of the 3-dimensional structure 51 is provided on both surfaces of the support portion 160 in the Z direction.

When the light guiding portion 32 is assembled with the support portion 160, the 3-dimensional structure 511 is used. In addition, when the slider 2 is assembled with the support portion 160, the 3-dimensional structure 512 is used. The light guiding portion 32 and the slider 2 are disposed so as to be aligned along the 3-dimensional structure 511 and the 3-dimensional structure 512, respectively. By disposing in this manner, the light guiding portion 32 or the slider 2 can be disposed at a proper position in the X direction with respect to the support portion 160. However, as shown in FIG. 6A, when there is only the 3-dimensional structure 50 available for positioning the light guiding portion 32 and the support portion 160, the light guiding portion 32 is first positioned using the 3-dimensional structure 50, and thereafter, the slider 2 is disposed at a position such that the light flux from the light guiding portion 32 is effectively incident to the slider 2 and is fixed at the position.

Third Embodiment

Next, the present embodiment will be described based on FIG. 7. The present embodiment is different from the first embodiment in terms of the configuration of the tip end portion of the head gimbal assembly 12, and the other configuration is substantially the same as the first embodiment. In the following description, the same configuration as the first embodiment will be denoted by the same reference numerals, and description thereof will be omitted.

Figure 7:
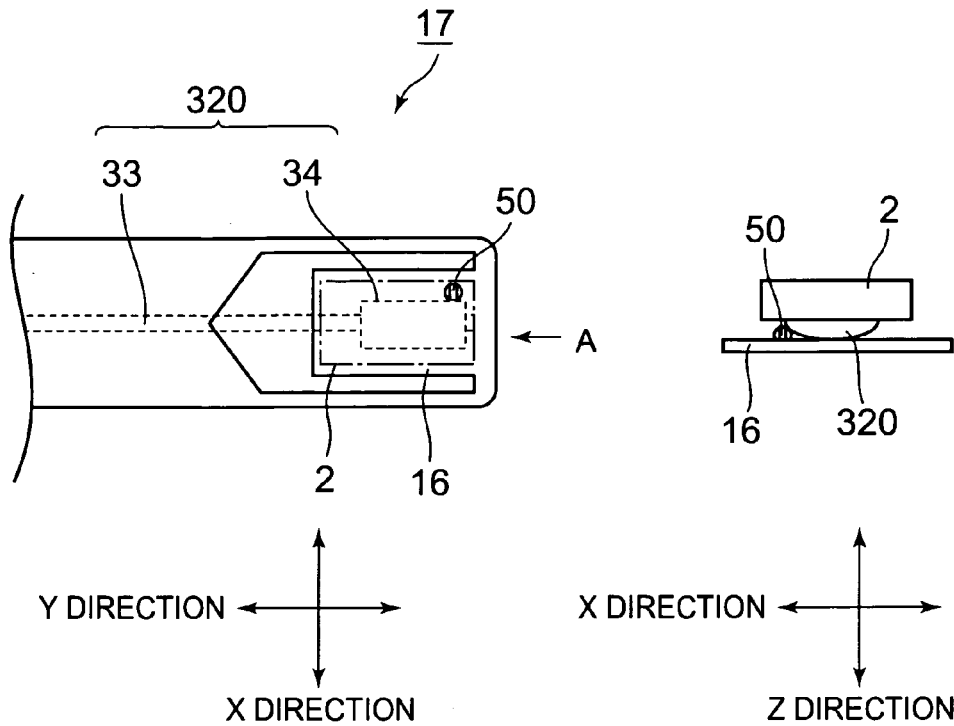
FIG. 7 is a top plan view (the left figure) of the tip end portion of the gimbal 17, the slider 2, and a light guiding portion 320 according to a third embodiment and are a side view (the right figure) as viewed from the arrow A in the left figure.

FIG. 7 shows the tip end portion of the gimbal 17, the slider 2, and a light guiding portion 320 according to the third embodiment. The left figure is an X-Y plan view, and the right figure is an X-Z plan view as viewed from the arrow A in the left figure. The light guiding portion 320 according to the present embodiment includes an optical waveguide 33 and an optical element 34. The optical waveguide 33 guides the light flux from the laser unit 20 up to the vicinity of the tip end of the slider 2. The optical element 34 bends the light flux emitted from the optical waveguide 33 to be incident to the slider 2. The 3-dimensional structure 50 is provided so as to be able to properly position the light guiding portion 320 on the support portion 16 when the light guiding portion 320 is disposed so that one end of the optical element 34 is aligned along the 3-dimensional structure 50.

When the light guiding portion 320 is assembled with the support portion 16, the light guiding portion 320 is disposed so that the optical element 34 is aligned along the 3-dimensional structure 50. After that, the slider 2 is disposed at a position such that the light flux emitted from the optical element 34 is effectively incident to the slider 2 and is fixed at the position. The disposing and fixing of the slider 2 and the light guiding portion 320 may be performed in advance before the positioning of the light guiding portion 320 and the support portion 16 is performed.

Fourth Embodiment

Next, the present embodiment will be described based on FIG. 8. The present embodiment is different from the first embodiment in terms of the configuration of the tip end portion of the head gimbal assembly 12, and the other configuration is substantially the same as the first embodiment. In the following description, the same configuration as the first embodiment will be denoted by the same reference numerals, and description thereof will be omitted.

Figure 8:
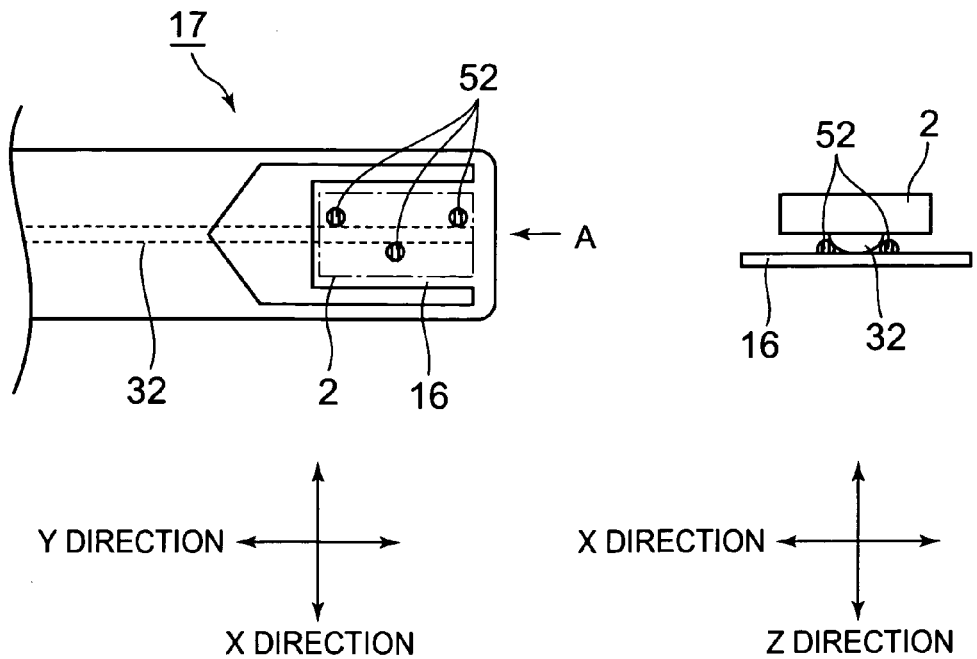
FIG. 8 is a top plan view (the left figure) of the tip end portion of the gimbal 17, the slider 2, and the light guiding portion 32 according to a fourth embodiment and is a side view (the right figure) as viewed from the arrow A in the left figure.

FIG. 8 shows the tip end portion of the gimbal 17, the slider 2, and the light guiding portion 32 according to the fourth embodiment. The left figure is an X-Y plan view, and the right figure is an X-Z plan view as viewed from the arrow A in the left figure. The support portion 16 according to the present embodiment is provided with a 3-dimensional structure 52 at both sides of the light guiding portion 32 with the light guiding portion 32 interposed therebetween. The 3-dimensional structures 52 are provided so as to be able to properly position the light guiding portion 32 on the support portion 16 when the light guiding portion 32 is disposed so as to be aligned along all of the plurality of 3-dimensional structures 52.

In the present embodiment, by disposing the light guiding portion 32 on the support portion 16 so as to be aligned along the 3-dimensional structure 52 including a plurality of 3-dimensional structures, it is possible to easily dispose the light guiding portion 32 on the support portion 16 even when the support portion 16 is greatly deflectable in the thickness direction.

Fifth Embodiment

Next, the present embodiment will be described based on FIGS. 9A and 9B. The present embodiment is different from the first embodiment in terms of the configuration of the tip end portion of the head gimbal assembly 12, and the other configuration is substantially the same as the first embodiment. In the following description, the same configuration as the first embodiment will be denoted by the same reference numerals, and description thereof will be omitted.

FIGS. 9A and 9B show the tip end portion of the gimbal 17, the slider 2, and the light guiding portion 32 according to the fifth embodiment. The left figures are X-Y plan views, and the right figures are X-Z plan views as viewed from the arrow A in the left figures. As shown in FIG. 9A, the support portion 16 according to the present embodiment includes a 3-dimensional structure 53 that includes a 3-dimensional structure 531 and a 3-dimensional structure 532. The 3-dimensional structure 531 is capable of achieving X-directional positioning. Moreover, the 3-dimensional structure 532 is capable of achieving Y-directional positioning of the light guiding portion 32 and the support portion 16. The 3-dimensional structure 531 is provided so as to be able to properly achieve X-directional positioning of the light guiding portion 32 and the support portion 16 by disposing the light guiding portion 32 so that a side surface of the light guiding portion 32 is aligned along the 3-dimensional structure 531. On the other hand, the 3-dimensional structure 532 is provided so as to be able to properly achieve Y-directional positioning of the light guiding portion 32 and the support portion 16 by disposing the light guiding portion 32 so that the tip end portion of the light guiding portion 32 comes into contact with the 3-dimensional structure 531. Here, a 3-dimensional structure 542 for achieving the Y-directional positioning may be configured as shown in FIG. 9B. That is, the convex shape of the 3-dimensional structure 542 is configured to be thicker than the thickness of the light guiding portion 32. With this configuration, the 3-dimensional structure 542 comes into contact with the tip end portion of the slider 2 disposed on the light guiding portion 32. Therefore, the positioning of the slider 2 and the light guiding portion 32 in the Y direction of the support portion 16 can be achieved. A 3-dimensional structure 54 including such a 3-dimensional structure 542 may be used.

When the light guiding portion 32 and the slider 2 are assembled, first, the light guiding portion 32 is disposed on the support portion 16 so as to be aligned along the 3-dimensional structure 541. Subsequently, the light guiding portion 32 is moved in the Y direction to a position where the tip end portion of the light guiding portion 32 comes into contact with the 3-dimensional structure 542, and the light guiding portion 32 is fixed at the position. After that, the slider 2 is disposed at a position such that the tip end portion of the slider 2 comes into contact with the 3-dimensional structure 542 and is fixed at the position. At that time, the X-directional position of the slider 2 is determined at a position such that the light flux from the light guiding portion 32 is effectively incident to the slider 2. However, as shown in FIG. 9A, in the case of the 3-dimensional structure 532 in which the 3-dimensional structure for achieving the Y-directional positioning has only the function of positioning only the light guiding portion 32, the assembling is performed in accordance with the following flow. First, only the light guiding portion 32 is positioned in the X-Y direction using the 3-dimensional structure 53. After that, the slider 2 is disposed at a position such that the light flux emitted from the light guiding portion 32 is effectively incident on the slider 2 and is fixed at the position.

In addition, in any of the configurations shown in FIG. 9A and 9B, the disposing and fixing of the slider 2 and the light guiding portion 32 may be performed in advance before the, positioning of the light guiding portion 32 and the support portion 16 is performed.

In the present embodiment, the 3-dimensional structure 53 or 54 has a function of positioning one or both of the light guiding portion 32 and the slider 2 in the Y direction of the support portion 16. With this configuration, the light guiding portion 32 or the slider 2 can be easily disposed in the Y direction of the support portion 16.

Sixth Embodiment

Next, the present embodiment will be described based on FIGS. 10A, 10B, and 10C. The present embodiment is different from the first embodiment in terms of the configuration of the tip end portion of the head gimbal assembly 12, and the other configuration is substantially the same as the first embodiment. In the following description, the same configuration as the first embodiment will be denoted by the same reference numerals, and description thereof will be omitted.

Figure 10A:
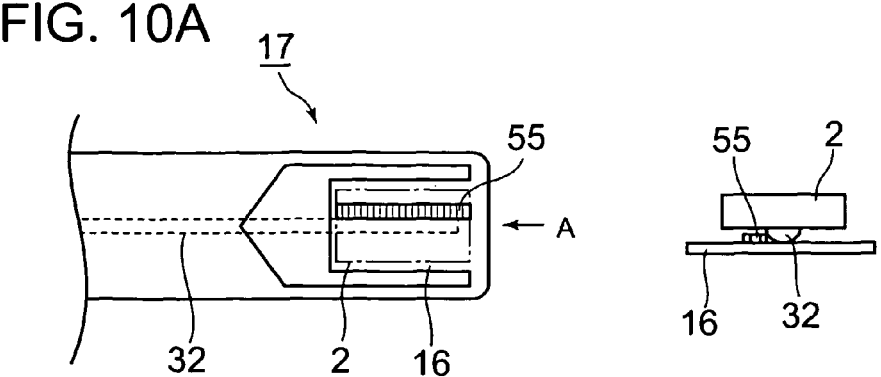
FIGS. 10A, 10B, and 10C are top plan views (the left figures) of the tip end portion of the gimbal 17, the slider 2, and the light guiding portion 32 according to a sixth embodiment and are side views (the right figures) as viewed from the arrow A in the left figures.
Figure 10B:
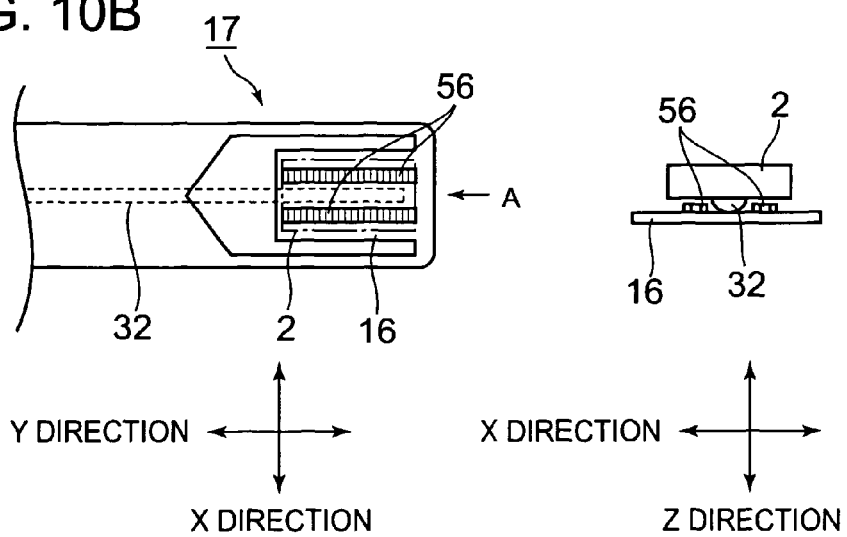
Figure 10C:
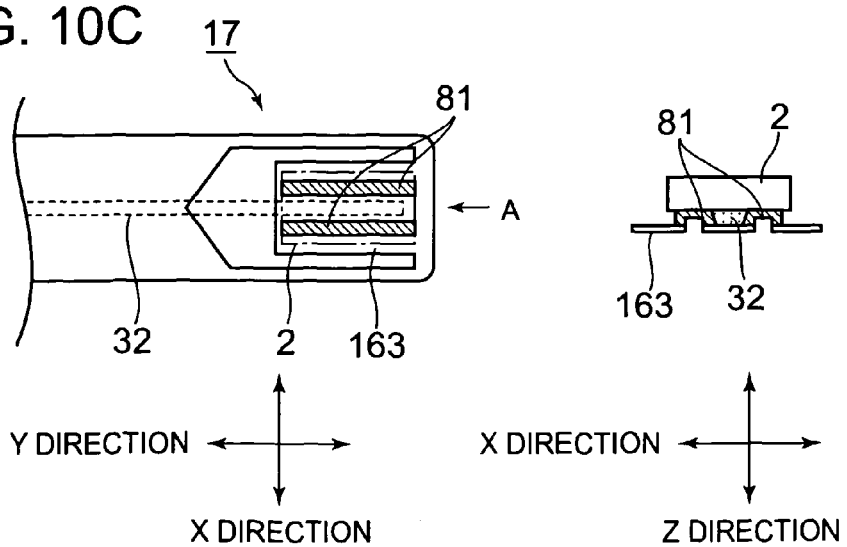

FIGS. 10A, 10B, and 10C show the tip end portion of the gimbal 17, the slider 2, and the light guiding portion 32 according to the sixth embodiment. The left figures are X-Y plan views, and the right figures are X-Z plan views as viewed from the arrow A in the left figures. As shown in FIG. 10A, the support portion 16 according to the present embodiment includes one 3-dimensional structure 55 having a convex shape that extends in the Y direction. The 3-dimensional structure 55 is provided so as to be able to properly dispose the light guiding portion 32 in the X direction of the support portion 16 when the light guiding portion 32 is disposed so as to be aligned along the longitudinal direction of the 3-dimensional structure 55. Here, a 3-dimensional structure like the 3-dimensional structure 55 does not need to be singular in number, but a 3-dimensional structure 56 as shown in FIG. 10B which is provided at both sides of the light guiding portion 32 with the light guiding portion 32 interposed therebetween may be used. In addition, the 3-dimensional structure may be configured as 3-dimensional structures 81 as shown in FIG. 10C which are formed to be integral with a support portion 163 so as to follow the outer shape of the light guiding portion 32.

When the light guiding portion 32 is assembled with the support portion 163, the light guiding portion 32 is disposed so as to be inserted from the base end side of the gimbal 17 toward the tip end side thereof. At that time, the light guiding portion 32 is aligned along one of the 3-dimensional structures 81. Alternatively, after the light guiding portion 32 is disposed at an appropriate position of the support portion 163, the light guiding portion 32 may be slide so that a side surface of the light guiding portion 32 makes contact with the entire longitudinal side surface of one of the 3-dimensional structures 81.

In the present embodiment, the 3-dimensional structure 55 or 56 includes an elongated portion that extends in a predetermined direction. With this configuration, it is possible to dispose the light guiding portion 32 by sliding the light guiding portion 32 along the elongated portion. Therefore, it is possible to easily dispose the light guiding portion 32 on the support portion 16 or 163 even when the support portion 16 or 163 is greatly deflected in the thickness direction.

Seventh Embodiment

Next, the present embodiment will be described based on FIG. 11. The present embodiment is different from the first embodiment in terms of the configuration of the tip end portion of the head gimbal assembly 12, and the other configuration is substantially the same as the first embodiment. In the following description, the same configuration as the first embodiment will be denoted by the same reference numerals, and description thereof will be omitted.

FIG. 11 shows the tip end portion of the gimbal 17, the slider 2, and the light guiding portion 32 according to the seventh embodiment. The left figure is a perspective view of the tip end portion of the gimbal 17, the slider 2, and the light guiding portion 32 as viewed from a direction where the slider 2 is seen on the top. The right figure is an X-Z plan view as viewed from the arrow A in the left figure. A support portion 161 according to the present embodiment is provided with a 3-dimensional structure 57. The 3-dimensional structure 57 protrudes in the Z direction opposite to the side where the slider 2 is provided. Moreover, the 3-dimensional structure 57 is configured so that the light guiding portion 32 is fitted into the protruding portion thereof. Furthermore, the 3-dimensional structure 57 is formed to be integral with the support portion 161. The light guiding portion 32 is disposed so as to be aligned along one of the surfaces (inner surfaces) of the 3-dimensional structure 57 where the light guiding portion 32 is fitted. By doing so, the 3-dimensional structure 57 is provided so as to be able to achieve positioning of the support portion 161 and the light guiding portion 32.

When the light guiding portion 32 is assembled with the support portion 161, the 3-dimensional structure 57 provided on the support portion 161 is used. First, the tip end portion of the light guiding portion 32 is fitted into the protrusion of the 3-dimensional structure 57, and the light guiding portion 32 is disposed so as to be aligned along one of the inner side surfaces of the protrusion. After that, the slider 2 is disposed at a position such that the light flux from the light guiding portion 32 is effectively incident on the slider 2, and is fixed at the position. The disposing and fixing of the slider 2 and the light guiding portion 32 may be performed in advance before the positioning of the light guiding portion 32 and the support portion 161 is performed.

In the present embodiment, the support portion 161 is provided with the 3-dimensional structure 57 to which the light guiding portion 32 is fitted. With this configuration, even when the light guiding portion 32 does not have a sufficient surface area to an extent that it can be fixed to the support portion 16, the disposing and fixing of the light guiding portion 32 with respect to the support portion 16 can be performed easily.

Eighth Embodiment

Next, the present embodiment will be described based on FIG. 12. The present embodiment is different from the second embodiment in terms of the configuration of the tip end portion of the head gimbal assembly 12, and the other configuration is substantially the same as the second embodiment. In the following description, the same configuration as the second embodiment will be denoted by the same reference numerals, and description thereof will be omitted.

FIG. 12 shows the tip end portion of the gimbal 17, the slider 2, and the light guiding portion 32 according to the eighth embodiment. The left figure is a perspective view of the tip end portion of the gimbal 17, the slider 2, and the light guiding portion 32 as viewed from a direction where the slider 2 is seen on the top. The right figure is an X-Z plan view as viewed from the arrow A in the left figure. A support portion 160 according to the present embodiment is provided with a 3-dimensional structure 58 on a side opposite to the side where the slider 2 is provided. The 3-dimensional structure 58 has a cavity in which the light guiding portion 32 can be received. Moreover, the 3-dimensional structure 58 has a convex shape that extends in the Y direction. The 3-dimensional structure 58 is provided so as to be able to achieve positioning of the support portion 160 and the light guiding portion 32 by disposing the light guiding portion 32 so as to be aligned along the inner side surfaces of the cavity of the 3-dimensional structure 58.

When the light guiding portion 32 is assembled with the support portion 160, the light guiding portion 32 is first moved from the base end side of the gimbal 17 toward the tip end side thereof and is then fitted into the cavity of the 3-dimensional structure 58. Moreover, the light guiding portion 32 is disposed so as to be aligned along the inner side surfaces of the cavity and fixed. After that, the slider 2 is disposed at a position such that the light flux from the light guiding portion 32 is effectively incident on the slider 2 via the optical optical aperture 70 of the support portion 160 and is fixed at the position.

In the present embodiment, the support portion 160 is provided with the 3-dimensional structure 58 to which the light guiding portion 32 is fitted. With this configuration, even when the light guiding portion 32 does not have a sufficient surface area to an extent that it can be fixed to the support portion 160, the disposing and fixing of the light guiding portion 32 with respect to the support portion 160 can be performed easily.

Ninth Embodiment

Next, the present embodiment will be described based on FIG. 13. The present embodiment is different from the first embodiment in terms of the configuration of the tip end portion of the head gimbal assembly 12, and the other configuration is substantially the same as the first embodiment. In the following description, the same configuration as the first embodiment will be denoted by the same reference numerals, and description thereof will be omitted.

Figure 13:
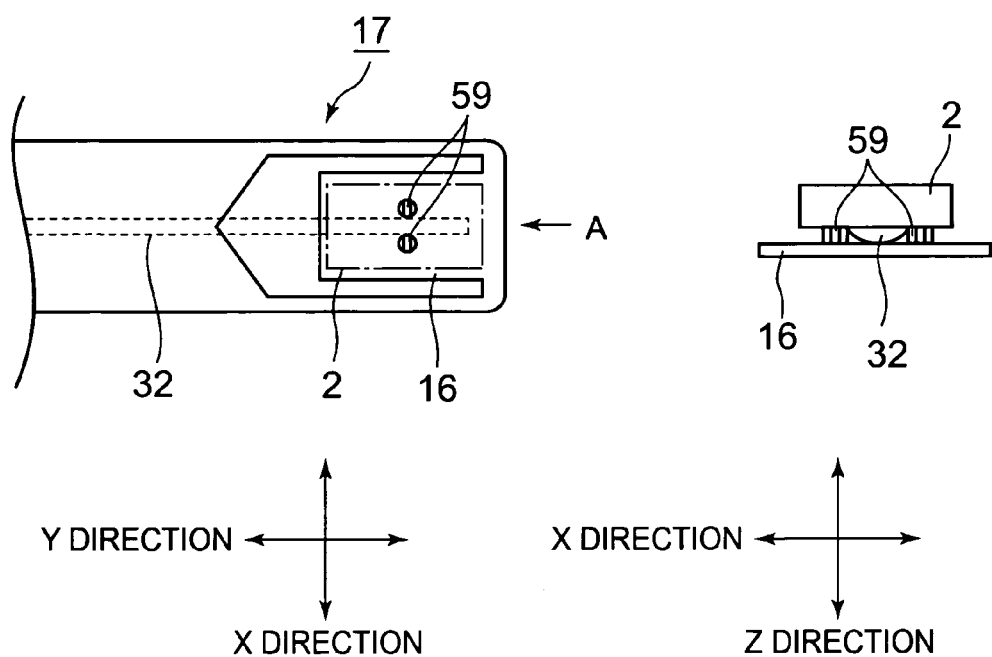
FIG. 13 is a top plan view (the left figure) of the tip end portion of the gimbal 17, the slider 2, and the light guiding portion 32 according to a ninth embodiment and is a side view (the right figure) as viewed from the arrow A in the left figure.

FIG. 13 shows the tip end portion of the gimbal 17, the slider 2, and a light guiding portion 32 according to the ninth embodiment. The left figure is an X-Y plan view, and the right figure is an X-Z plan view as viewed from the arrow A in the left figure. The support portion 16 according to the present embodiment is provided with a 3-dimensional structure 59 for achieving positioning of the light guiding portion 32, at both sides of the light guiding portion 32 with the light guiding portion 32 interposed therebetween. The 3-dimensional structures 59 are provided so that a distance between the two 3-dimensional structures 59 is almost the same as the width of the light guiding portion 32. The 3-dimensional structures 59 are provided so as to be able to achieve positioning of the light guiding portion 32 and the support portion 16 when the light guiding portion 32 is disposed so as to be aligned along both of the two 3-dimensional structures 59.

When the light guiding portion 32 is assembled with the support portion 16, the light guiding portion 32 is disposed on the support portion 16 so as to be aligned along both of the 3-dimensional structures 59 and fixed.

In the present embodiment, the distance between the two 3-dimensional structures 59 is approximately the same as the width of the light guiding portion 32. With this configuration, when the light guiding portion 32 is disposed on the support portion 16, the correct positioning in the width direction of the suspension 3 can be achieved more easily.

Tenth Embodiment

Next, the present embodiment will be described based on FIGS. 14A and 14B. The present embodiment is different from the first embodiment in terms of the configuration of the tip end portion of the head gimbal assembly 12, and the other configuration is substantially the same as the first embodiment. In the following description, the same configuration as the first embodiment will be denoted by the same reference numerals, and description thereof will be omitted.

FIGS. 14A and 14B show the tip end portion of the gimbal 17, the slider 2, and a light guiding portion 32 according to the tenth embodiment. The left figure is an X-Y plan view, and the right figures are X-Z plan views as viewed from the arrow A in the left figure. As shown in FIG. 14A, a support portion 162 according to the present embodiment is provided with a 3-dimensional structure 80 for positioning the light guiding portion 32 on the support portion 162. The 3-dimensional structure 80 is a notch which is formed to be integral with the support portion 162. The 3-dimensional structure 80 is formed by cutting the material of the support portion, at which the light guiding portion 32 is disposed, to a width almost the same as the width of the light guiding portion 32. Moreover, the 3-dimensional structure 80 is formed so as to properly achieve the X-directional positioning of the light guiding portion 32 and the support portion 162 when the light guiding portion 32 is disposed so that the side surface of the light guiding portion 32 is aligned along a longitudinal outer shape of the notch. In addition, the 3-dimensional structure 80 is formed so as to be able to properly achieve the Y-directional positioning of the light guiding portion 32 and the support portion 162 when the tip end portion of the light guiding portion 32 is disposed to come into contact with a transversal outer shape of the notch. The light guiding portion 32 has approximately the same thickness as the support portion 162. However, the light guiding portion 32 is not limited to this, but a light guiding portion 321 whose sectional outer shape is a circular arc as shown in FIG. 14C may be used. The light guiding portion 321 is formed, for example, by flatly chipping away a side surface of the optical fiber facing the slider 2. Here, the thickness of the light guiding portion 321 may not be approximately the same as the support portion 162. That is, a part of the light guiding portion 321 may protrude from a surface of the support portion 162 opposite to the side of the slider 2.

When the light guiding portion 321 is assembled with the support portion 162, first, the light guiding portion 321 and the slider 2 are positioned in advance so that the light flux emitted from the light guiding portion 321 is effectively incident to the slider 2, and they are fixed. After that, the light guiding portion 321 to which the slider 2 is fixed already is disposed so that the outer shape of the tip end of the light guiding portion 321 is identical to the outer shape of the notch of the 3-dimensional structure 80, and the slider 2 and the support portion 162 are fixed.

Here, the light guiding portion 321 and the slider 2 are not necessarily fixed in advance before the positioning of the light guiding portion 321 and the support portion 162 is achieved. When the light guiding portion 321 has been assembled with the support portion 162, the slider 2 and the support portion 162 may be fixed so that the light flux from the light guiding portion 321 is effectively incident to the slider 2. After that, the slider 2 and the light guiding portion 321 may be fixed directly by disposing them so that the outer shape of the tip end of the light guiding portion 321 is identical to the outer shape of the notch of the 3-dimensional structure 80. However, when assembling in this manner, it may be helpful to provide positioning marks of the slider 2 or the like on a side of the support portion 162 where the slider 2 is fixed so that the light flux from the light guiding portion 321 is effectively incident to the slider 2.

In the present embodiment, since the support portion 162 has the notch, the light guiding portion 32 or 321 can be disposed using the notch portion as a landmark. Therefore, the positioning of the support portion 162 and the light guiding portion 32 or 321 can be achieved easily.

Eleventh Embodiment

Next, the present embodiment will be described based on FIGS. 15A and 15B. The present embodiment is different from the first embodiment in terms of the configuration of a light guiding portion 93, and the other configuration is substantially the same as the first embodiment. In the following description, the same configuration as the first embodiment will be denoted by the same reference numerals, and description thereof will be omitted.

Figure 15A:
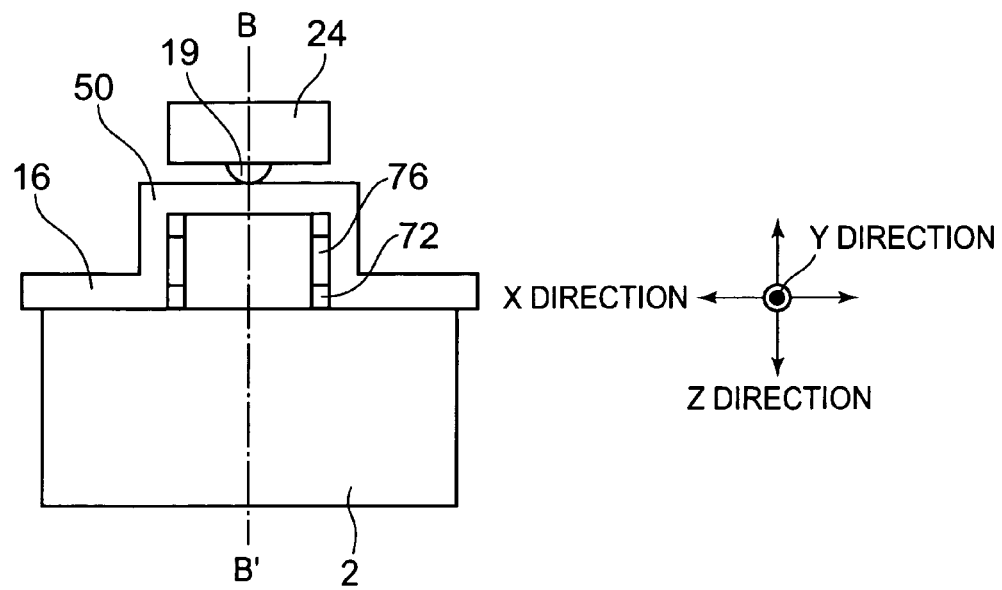
FIG. 15A is a sectional view of a head gimbal assembly 12 according to an eleventh embodiment as viewed from a tip end side thereof.
Figure 15B:
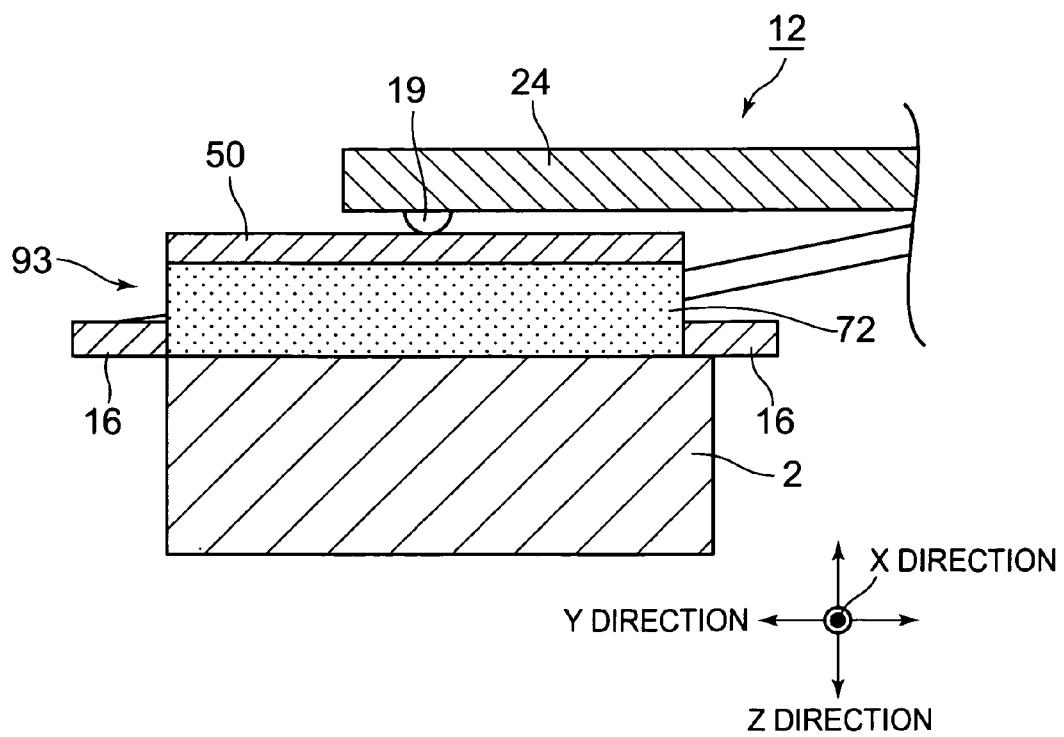
FIG. 15B is a sectional view taken along the line B-B' in FIG. 15A.

FIG. 15A is an enlarged sectional view of the tip end portion of the head gimbal assembly 12 according to the eleventh embodiment as viewed from the Y direction. FIG. 15B is a sectional view taken along the line B-B' in FIG. 15A as viewed from the X direction. A light guiding portion 93 according to the present embodiment is configured by a laser unit 72 in its entirety. The laser unit 72 is provided with a laser electrode 76. Therefore, the laser unit 72 has such an unstable shape that it is likely to roll when it is disposed on the support portion 16. The light flux emitted from the laser unit 72 is directly incident to the slider 2.

According to the present embodiment, in addition to the effects of the first embodiment, it is possible to reduce manufacturing costs since the laser unit 72 is mounted on the slider 2, and thus optical components such as optical fiber are not necessary.

Twelfth Embodiment

Next, the present embodiment will be described based on FIG. 16. The present embodiment is different from the first embodiment in terms of the configuration of the light guiding portion 94, and the other configuration is substantially the same as the first embodiment. In the following description, the same configuration as the first embodiment will be denoted by the same reference numerals, and description thereof will be omitted.

FIG. 16 is an enlarged sectional view of the tip end portion of the head gimbal assembly 12 according to the twelfth embodiment as viewed from the X direction. A light guiding portion 94 according to the present embodiment is provided with a laser unit 73 and a waveguide lens 88. Moreover, the entirety of the light guiding portion 94 is mounted on a surface of the slider 2 opposite to the air bearing surface 2a. The laser unit 73 is disposed to be adjacent to the support portion 16. The waveguide lens 88 is disposed to be adjacent to the laser unit 73 on the opposite side of the support portion 16. The light flux emitted from the laser unit 73 is incident to the slider 2 with a spot diameter thereof adjusted by the waveguide lens 88. Here, the waveguide lens 88 may have a function of focusing the light flux emitted from the laser unit 73 and may have a function of outputting a non-focused parallel light flux.

According to the present embodiment, in addition to the effects of the eleventh embodiment, even when the light flux emitted from the laser unit 73 has experienced widening or distortion, since the waveguide lens 88 is provided in the light guiding portion 94, the light flux emitted from the laser unit 73 can be effectively incident to the slider 2. Therefore, it is possible to realize the head gimbal assembly 12 having high optical efficiency.

Thirteenth Embodiment

Next, the present embodiment will be described based on FIG. 17. The present embodiment is different from the first embodiment in terms of the configuration of a light guiding portion 95, and the other configuration is substantially the same as the first embodiment. In the following description, the same configuration as the first embodiment will be denoted by the same reference numerals, and description thereof will be omitted.

Figure 17:
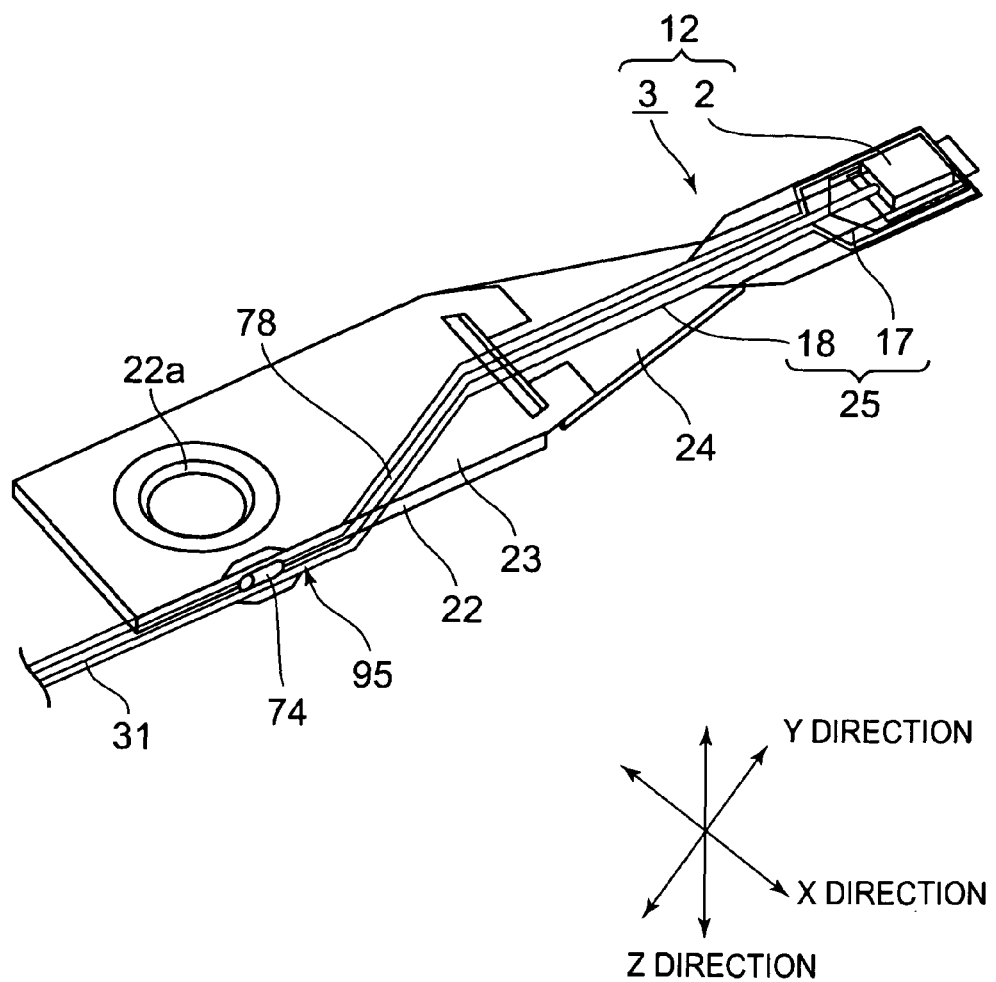
FIG. 17 is a perspective view of the head gimbal assembly 12 according to a thirteenth embodiment.

FIG. 17 is a perspective view of the head gimbal assembly 12 with the slider 2 directed upward. A light guiding portion 95 according to the present invention is provided with a laser unit 74 in a part thereof. Moreover, the laser unit 74 is disposed on the support body 18 at a position distant from the slider 2. The light flux emitted from the laser unit 74 propagates to the tip end portion of the slider 2 through an optical fiber 78. Moreover, the light flux is diffracted at the tip end portion of the slider 2 in a direction perpendicular to the air bearing surface 2a of the slider 2 and incident to the slider 2.

According to the present embodiment, the laser unit 74 is disposed at a position distant from the slider 2. With this configuration, in addition to the effects of the first embodiment, the slider 2 is hardly affected by the heat generated from the laser unit 74. Therefore, it is possible to obviate the influence of the heat on the flying characteristics, and a stable recording and reproducing operation can be performed.

Fourteenth Embodiment

Next, the present embodiment will be described based on FIG. 18. The present embodiment is different from the first embodiment in terms of the configuration of a light guiding portion 96, and the other configuration is substantially the same as the first embodiment. In the following description, the same configuration as the first embodiment will be denoted by the same reference numerals, and description thereof will be omitted.

FIG. 18 is an enlarged sectional view of the tip end portion of the head gimbal assembly 12 according to the fourteenth embodiment as viewed from the X direction. A light guiding portion 96 according to the present embodiment is provided with a laser unit 75 and a waveguide lens 89. The waveguide lens 89 is disposed at an inner side of the laser unit 75. Moreover, the waveguide lens 89 is formed in advance to be integral with the laser unit 75. In addition, the laser unit 75 has a partial portion that does not make contact with the slider 2.

According to the present embodiment, even when the light flux emitted from the laser unit 75 travels in a direction parallel to the air bearing surface 2*a* of the slider 2, the light flux from the laser unit 75 can be effectively guided to the slider 2. Therefore, in addition to the effects of the first embodiment, it is possible to realize the head gimbal assembly 12 having high optical efficiency. Moreover, the laser unit 75 and the waveguide lens 89 are formed to be integral therewith. With this configuration, it is possible to decrease the number of steps for achieving optical positioning of the laser unit 75 and the waveguide lens 89 at the time of assembling the head gimbal assembly 12. Furthermore, since apart of the laser unit 75 does not make contact with the slider 2, a part of the heat radiated from the laser unit 75 can be discharged into the air. Therefore, it is possible to reduce the influence of the heat radiated from the laser unit 75. Accordingly, it is possible to reduce the influence of the heat on the flying characteristics, and a stable recording and reproducing operation can be performed.

INDUSTRIAL APPLICABILITY

According to the head gimbal assembly according to the present invention, the support portion is provided at the tip end portion of the suspension. With this configuration, it is possible to realize a high-density information recording and reproducing apparatus using a hybrid magnetic recording method capable of performing a stable recording and reproducing operation. Moreover, even when the support portion which is easily deflectable in the thickness direction is provided, since the 3-dimensional structure for achieving positioning of the support-facing portion is provided, it is possible to easily dispose the support-facing portion on the support portion. Therefore, the manufacturing efficiency can be improved.

What is claimed is:

1. A head gimbal assembly that records information on a recording medium using a near-field light, comprising:
    a suspension that extends along a surface of the recording medium, and is deflectable in a thickness direction;
    a support portion that is provided at a tip end side of the suspension, and is more deflectable in the thickness direction than the suspension;
    a light guiding portion that has a support-facing portion facing the support portion, introduces a light flux used for generating the near-field light, and provided to the support portion; and
    a 3-dimensional structure that is provided to the support portion and used for positioning the support-facing portion on a desired portion of the support portion,
    wherein the support-facing portion has a portion in which a width of a sectional surface perpendicular to a longitudinal direction of the suspension is larger than a width of a contact surface that makes contact with the support portion.

2. The head gimbal assembly according to claim 1, wherein the support-facing portion has a curved surface.

3. The head gimbal assembly according to claim 1, wherein the 3-dimensional structure is formed to be integral with the support portion and is configured by deforming the support portion.

4. The head gimbal assembly according to claim 1,
    wherein the head gimbal assembly includes a slider that is disposed on a tip end side of the suspension so as to face the surface of the recording medium and generates the near-field light using the light flux, and
    wherein the 3-dimensional structure is used for positioning the slider on a desired portion of the support portion.

5. The head gimbal assembly according to claim 1, wherein the 3-dimensional structure has a convex portion.

6. The head gimbal assembly according to claim 5,
    wherein a plurality of the convex portions is provided, and
    wherein the support-facing portion is disposed between the respective convex portions.

7. The head gimbal assembly according to claim 1,
    wherein a part of the 3-dimensional structure has a function of positioning the support-facing portion on a desired portion of the support portion in a width direction of the suspension, and
    wherein a remaining part of the 3-dimensional structure has a function of positioning the support-facing portion on a desired portion of the support portion in a longitudinal direction of the suspension.

8. The head gimbal assembly according to claim 1, wherein the 3-dimensional structure has an elongated portion, and the support-facing portion is disposed on a lateral side of the elongated portion.

9. The head gimbal assembly according to claim 1, wherein the 3-dimensional structure includes a support-facing portion-fixing portion to which the support-facing portion is fitted.

10. The head gimbal assembly according to claim 9, wherein the support-facing portion-fixing portion is configured so that a width of a portion of the support-facing portion-fixing portion to which the support-facing portion is fitted is approximately the same as a width of the support-facing portion.

11. The head gimbal assembly according to claim 9, wherein an inner shape of the support-facing portion-fixing portion has approximately the same shape as a outer shape of a sectional surface perpendicular to a longitudinal direction of the support-facing portion.

12. The head gimbal assembly according to claim 1,
    wherein the 3-dimensional structure includes a base portion and a plate connected to the base portion,
    wherein the plate has two divided parts extending in a predetermined direction from the base portion, and
    wherein the support-facing portion is disposed between the respective divided parts.

13. The head gimbal assembly according to claim 1, wherein an entirety of the light guiding portion is a laser unit.

14. The head gimbal assembly according to claim 1, wherein a part of the light guiding portion is a laser unit.

15. The head gimbal assembly according to claim 13, wherein the entirety of the light guiding portion is provided on a surface of the slider opposite to an air bearing surface of the slider.

16. The head gimbal assembly according to claim 14, wherein the laser unit is provided at a position distant from the slider.

17. The head gimbal assembly according to claim 14, wherein the light guiding portion has a lens that adjusts the beam spot shape and position of a light flux emitted from the laser unit.

18. The head gimbal assembly according to claim 13, wherein the laser unit has a lens that adjusts the beam spot shape and position of a light flux emitted therefrom.

19. The head gimbal assembly according to claim 17,
    wherein the head gimbal assembly includes a slider that is disposed on a tip end side of the suspension so as to face the surface of the recording medium and generates the near-field light using the light flux, and wherein the lens is disposed so that an optical axis of light passing through the lens is perpendicular to a air bearing surface of the slider.

20. The head gimbal assembly according to claim 17, wherein the head gimbal assembly includes a slider that is disposed on a tip end side of the suspension so as to face the surface of the recording medium and generates the near-field light using the light flux, and wherein the lens is disposed so that an optical axis of light passing through the lens is parallel to a air bearing surface of the slider.

21. An information recording and reproducing apparatus comprising:

the head gimbal assembly according to claim 1;

a slider that is disposed on a tip end side of the suspension so as to face the surface of the recording medium and generates the near-field light using the light flux;

a pivot shaft that rotatably supports the head gimbal assembly; and a control unit that controls rotation of the head gimbal assembly about the pivot shaft.

* * * * *